(12) United States Patent
Kent

(10) Patent No.: US 11,051,114 B2
(45) Date of Patent: Jun. 29, 2021

(54) TRANSDUCER

(71) Applicant: BAE SYSTEMS plc, London (GB)

(72) Inventor: Lionel William Kent, Essex (GB)

(73) Assignee: BAE SYSTEMS plc, London (GB)

( * ) Notice: Subject to any disclaimer, the term of this patent is extended or adjusted under 35 U.S.C. 154(b) by 0 days.

(21) Appl. No.: 16/467,848

(22) PCT Filed: Nov. 27, 2017

(86) PCT No.: PCT/GB2017/053557
§ 371 (c)(1),
(2) Date: Jun. 7, 2019

(87) PCT Pub. No.: WO2018/104703
PCT Pub. Date: Jun. 14, 2018

(65) Prior Publication Data
US 2020/0221233 A1 Jul. 9, 2020

(30) Foreign Application Priority Data

Dec. 8, 2016 (GB) .................................. 1620851
Jul. 19, 2017 (EP) .................................. 17275112
Jul. 19, 2017 (GB) .................................. 1711609

(51) Int. Cl.
*H04R 17/10* (2006.01)
*G10K 11/00* (2006.01)
(Continued)

(52) U.S. Cl.
CPC .......... *H04R 17/10* (2013.01); *B06B 1/0618* (2013.01); *B06B 1/0644* (2013.01); *G01N 29/28* (2013.01);
(Continued)

(58) Field of Classification Search
CPC ........ H04R 17/00; G10K 11/02; H01L 41/08; H01L 41/0815; H01L 41/0805
See application file for complete search history.

(56) References Cited

U.S. PATENT DOCUMENTS 4,482,834 A * 11/1984 Dias ...................... B06B 1/0622
310/327
7,694,570 B1 4/2010 Dam et al.
2009/0072668 A1 * 3/2009 Gelly ..................... G10K 11/02
310/334

FOREIGN PATENT DOCUMENTS

EP 2401966 A1 1/2012
GB 2052917 A 1/1981
(Continued)

OTHER PUBLICATIONS

International Preliminary Report on Patentability received for PCT Application No. PCT/GB2017/053557, dated Jun. 20, 2019. 8 pages.
(Continued)

*Primary Examiner* — Sunita Joshi
(74) *Attorney, Agent, or Firm* — Finch & Maloney PLLC

(57) ABSTRACT

An electroacoustic transducer, comprising a piezoelectric part comprising a piezoelectric material having a first acoustical impedance and an acoustical thickness, a substrate part comprising a material having a second acoustical impedance, and an intermediate part comprising a material having a third acoustical impedance and at least partially sandwiched between the piezoelectric part and the substrate part for acoustical communication therewith. The first acoustical impedance and the second acoustical impedance each has a respective value within a range of values for which the value of third acoustical impedance: is an upper limit if said acoustical thickness is less than 0.4Λ, or is a lower limit if said acoustical thickness is greater than 0.4Λ where Λ is an
(Continued)

acoustical wavelength in the material of the piezoelectric part.

20 Claims, 20 Drawing Sheets

(51) Int. Cl.
*H04R 17/00* (2006.01)
*H01L 41/08* (2006.01)
*B06B 1/06* (2006.01)
*G01N 29/28* (2006.01)
*G01S 7/521* (2006.01)
*G10K 11/02* (2006.01)
*H04B 11/00* (2006.01)
*H04B 1/40* (2015.01)
*H04L 27/00* (2006.01)

(52) U.S. Cl.
CPC .......... *G01S 7/521* (2013.01); *G10K 11/002* (2013.01); *G10K 11/02* (2013.01); *H01L 41/08* (2013.01); *H04B 1/40* (2013.01); *H04B 11/00* (2013.01); *H04L 27/0002* (2013.01); *H04R 17/00* (2013.01); *B06B 2201/55* (2013.01); *G01N 2291/0231* (2013.01)

(56) References Cited

FOREIGN PATENT DOCUMENTS

| JP | 2000131298 A | 5/2000 |
| WO | 03002272 A1 | 1/2003 |
| WO | 2018104703 A1 | 6/2018 |

OTHER PUBLICATIONS

International Search Report and Written Opinion received for PCT Application No. PCT/GB2017/053557, dated Feb. 20, 2018. 13 pages.
GB Search Report under Section 17(5) received for GB Application No. 1711609.6 dated Jan. 9, 2018. 4 pages.

* cited by examiner

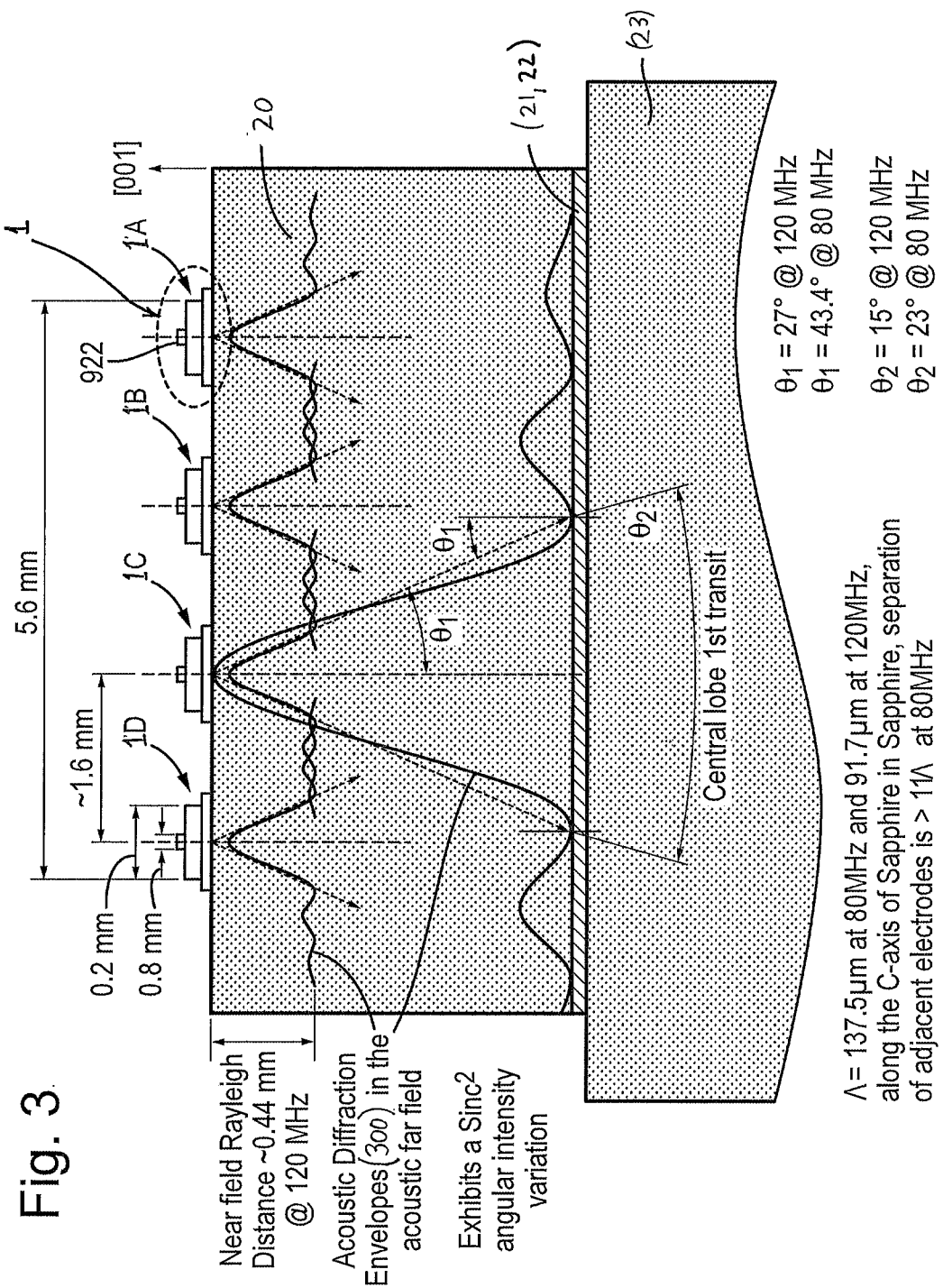

$L_{series}$ (41) = 1.25µH $L_{parallel}$ (42) = 1µH

Transformer (43) = 36:1 turns ratio

Electrode (22) = 0.2mm²

Centre frequency is 100MHz, with an electrically matched bandwidth of >40MHz

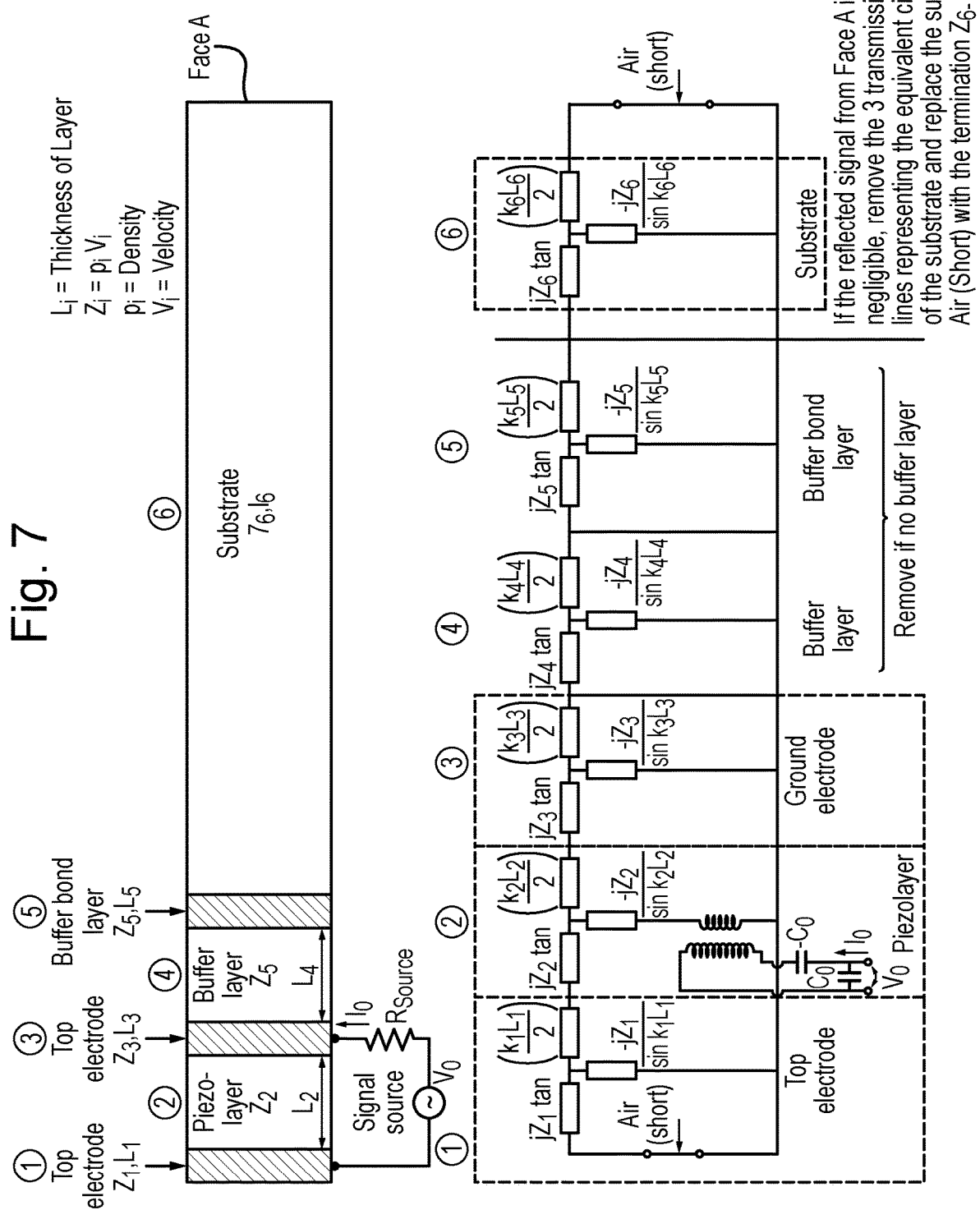

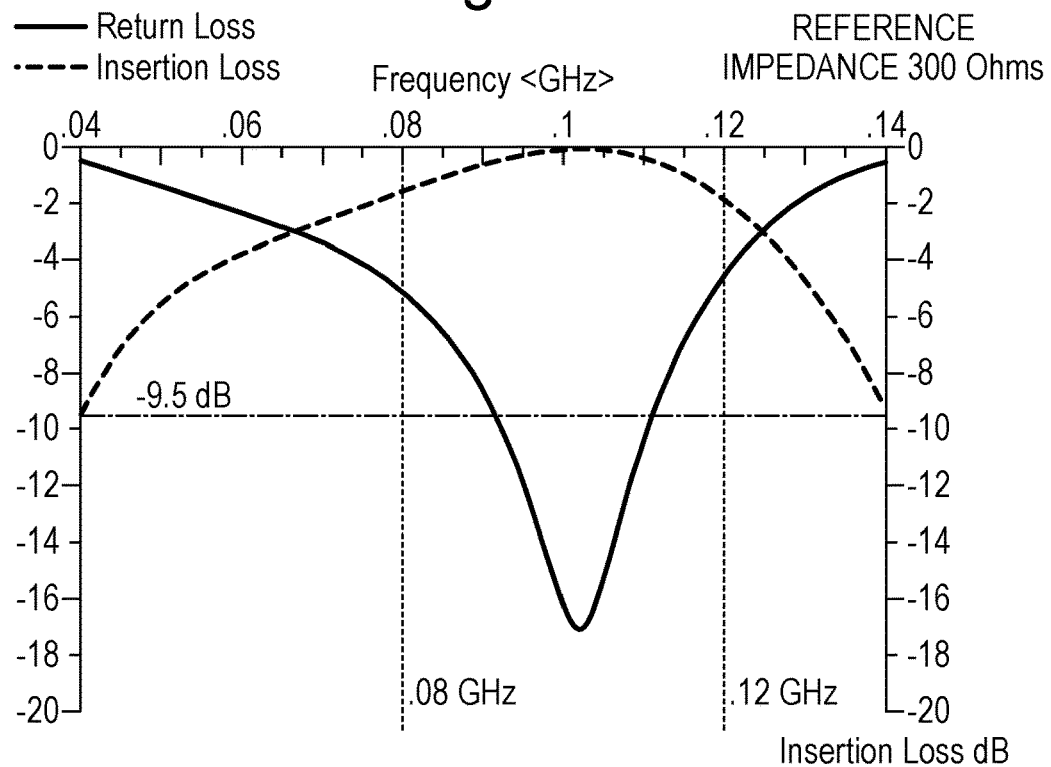
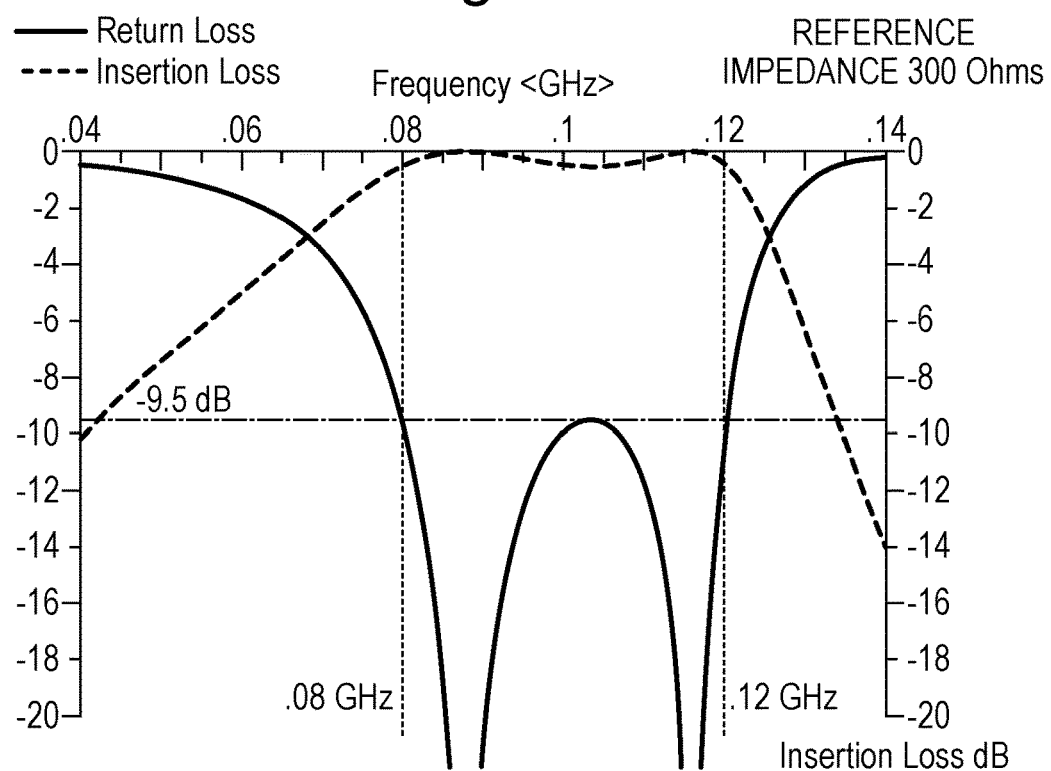

TOTAL FREQUENCY RANGE = .1 GHz
.04 TO .08 GHz  L_F  —··—··—
.08 TO .12 GHz  ⊖——⊖
.12 TO .14 GHz  ············ H_F
MARKER SPACING
= 1 MHz

REFERENCE
IMPEDANCE
350 Ohms

TOTAL FREQUENCY RANGE = .1 GHz
.04 TO .08 GHz  L_F  —··—··—
.08 TO .12 GHz  ⊖——⊖
.12 TO .14 GHz  ············ H_F
MARKER SPACING
= 1 MHz

REFERENCE
IMPEDANCE
350 Ohms

TRANSDUCER

FIELD OF THE INVENTION

The invention relates to acoustical transducers, such as piezo-electric transducers. In particular, though not exclusively, the invention relates to acoustical transducers for use in acoustic data transmission and/or power transmission and/or a data transceiver system.

BACKGROUND

Bulk wave acoustic transducers are mechanically resonant structures, and good acoustic coupling, between the resonating piezo-electric platelet of the transducer and the acoustic medium onto which it is interfaced, is required to support a wide signal frequency bandwidth response. This is a consequence of the well-known phenomena that the frequency bandwidth of a mechanical vibrating structure is a function of the mechanical Q of the structure, which is given by:

$$Q = \frac{f_r}{\Delta f} = 2\pi f_r \frac{\text{Energy stored}}{\text{Power Loss}} \quad (1)$$

Where $f_r$ is the natural resonant frequency of the structure, and $\Delta f$ is the frequency bandwidth (half power) of the structure.

A further practical constraint on the frequency bandwidth of an acoustic transducer is set by its electromechanical coupling coefficient. An example is the electromechanical coupling coefficient known in the art as '$k_t$', for example, associated with thin transducers whose cross-section is much wider than the thickness of the transducer. It is concerned with mechanical vibrations excited in the platelet thickness direction between electrodes on each end. This constant coefficient gives a measure of the coupling efficiency of the piezoelectric platelet for converting electrical power into mechanical power and vice versa.

The relationship between the mechanical Q of a transducer and therefore its fractional bandwidth $\Delta f/f_c$ 3 dB power points, and the electro-mechanical coupling constant $k_t$ is given by:

$$Q = \frac{f_c}{\Delta f} = \frac{\pi}{4k_t^2} \frac{z_T}{z_s} \quad (2)$$

Where $f_c$ is the centre frequency of the transducer, $\Delta f$ is the frequency bandwidth (half power) of the transducer, $Z_T$ is the electrical input impedance of the transducer, and $Z_S$ is the source output impedance of the electrical power source. The acoustic impedance of a medium is defined to be the product of its density and acoustic velocity, and is a direct analogue of electrical impedance and has similar relationships. This implies that the acoustic impedance mismatch of the transducer should be made as low as possible relative to the medium into which acoustic waves are being launched.

As an illustrative example, consider a 36°Y cut lithium niobate transducer which has an electromechanical coupling constant $k_t$ of 0.487 for longitudinal acoustic wave generation. If the lithium niobate transducer is electrically tuned to be electrically perfectly matched to its electrical power source, i.e. $Z_T = Z_S$, then the expected fractional bandwidth for the transducer 3 dB power points, is only 30%. The energy stored in the system, and thus the Q of the structure, is minimised by increasing the power loss of the structure (i.e. mechanical damping).

The invention aims to provide an improved transducer with desirable fractional bandwidth characteristics.

SUMMARY

The present innovation for increasing the bandwidth of a bulk acoustic wave transducer comprises arranging (e.g. bonding) an acoustically thin intermediate layer between the piezoelectric platelet and the main substrate into which sound is being launched. An acoustically thin layer may be a layer of material having an acoustic thickness less than the acoustic wavelength ($\Lambda$) in the medium in question. This is a surprising result. It is not an obvious outcome that a large increase in the matched bandwidth of the transducer can be achieved by adding an acoustically thin (e.g. semi-reflective) intermediate layer, particularly if the acoustic impedance of the intermediate layer is either lower than, or alternatively larger than the acoustic impedances values of both the piezoelectric layer and the main substrate. The addition of such an intermediate layer to the transducer structure is particularly effective when the acoustic impedance of the piezoelectric layer is lower than that of the main substrate.

According to current wisdom in the art, such an intermediate layer should slightly impede the coupling of acoustic energy out of the piezoelectric medium into the bulk acoustic medium. This is illustrated by the observation that the power reflection coefficient (R) of an acoustic wave incident at normal incidence to a boundary between two media of acoustic impedances $Z_1$ and $Z_2$ respectively, upon moving from medium 1 to medium 2, is given by:

$$R = \frac{(Z_2 - Z_1)^2}{(Z_1 + Z_2)^2} \quad (3)$$

The power transmission coefficient (T) of an acoustic wave incident at normal incidence to a boundary between the two media is given by:

$$T = \frac{4Z_1 Z_2}{(Z_1 + Z_2)^2} \quad (4)$$

Therefore, the best acoustic coupling between the piezoelectric transducer and the medium to which it is bonded would usually be achieved when the two media have nominally identical impedances. That is to say, the condition under which R=0 and T=1. Consequently, one would expect a reduction in performance and in the frequency bandwidth of the transducer by introduction of the intermediate layer. The opposite has been found. Note that one can ignore the impact on the total reflectivity, arising from the presence of any acoustically extremely thin bonding layers in the structure, and which may be optionally present in embodiments or aspects of the invention. The acoustic intermediate layer throughout this document is also referred to as a 'buffer layer'.

Current wisdom is based on the following considerations. When two adjacent media have a large acoustic impedance mismatch, for example $Z_1 \gg 2Z_2$ or alternatively $Z_2 \gg 2Z_1$, efficient coupling of acoustic waves between the two media can be facilitated by inserting at the interface between the two media a third medium with an acoustical thickness of $(2n+1)\Lambda/4$ where $\Lambda$ is the acoustic wavelength within the layer, and n is either 0 or a positive integer. The acoustic impedance $Z_i$ of the intermediate layer is then ideally selected to be:

$$Z_i = \sqrt{(Z_1 Z_2)} \quad (5)$$

The optimal thickness of $(2n+1)\Lambda/4$ is valid for an acoustic wave incident at normal incidence to the interface of the two main media. Under these circumstances, the acoustic impedance matching between the layers is optimal at the acoustic frequency where the thickness of the intermediate layer is equal exactly to an odd-integer multiple of one quarter of an acoustic wavelength.

According to the 'impedance translation theorem', the combined power reflection coefficient $R_e$ of two closely spaced interfaces due to an intermediate layer of acoustic impedance $Z_3$ that is sandwiched between the two main acoustic media of acoustic impedance $Z_1$ and $Z_2$, is given by:

$$R = \frac{(Z_{layer} - Z_1)}{(Z_{layer} + Z_1)} \frac{\overline{(Z_{layer} - Z_1)}}{\overline{(Z_{layer} + Z_1)}} \quad (6)$$

Where the overhead bar represents the complex conjugate, and where $Z_{layer}$ is the effective acoustic impedance arising from the finite thickness of the intermediate layer and the termination impedance $Z_2$ behind it. Provided that the acoustic attenuation in the intermediate layer is small, the effective load acoustic impedance, $Z_{layer}$, arising from the intermediate layer is given by the expression:

$$Z_{layer} = Z_3 \left\{ \frac{Z_2 \cos(k_{Layer} L) - i Z_3 \sin(k_{Layer} L)}{Z_3 \cos(k_{Layer} L) + i Z_2 \sin(k_{Layer} L)} \right\} \quad (7)$$

And $k_{layer}$ is the acoustic k vector given by:

$$k_{layer} = \frac{2\pi}{\Lambda} = \frac{2\pi f_a}{V_a} \quad (8)$$

Where $\Lambda$ is the acoustic wavelength, $f_a$ is the frequency of the acoustic wave, and $V_a$ is the acoustic velocity.

Equation 6, containing the term $Z_{layer}$, must be used to describe the effect of the intermediate electrode layer between the piezoelectric platelet and the main acoustic medium unless the electrode layer is acoustically extremely thin; typically $<<\lambda/10$ to $<\lambda/100$ at the operational centre frequency. Equation 6 then reduces to the form of equation 3 as the thickness L of the intermediate electrode layer tends to zero. The phase of the reflected acoustic wave from a material interface is dependent on the sign and value of the reflection coefficient r given by:

$$r = \frac{(Z_{layer} - Z_1)}{(Z_{layer} + Z_1)} \quad (9)$$

In the absence of an intermediate layer between a pair of media, the phase shift of the reflected acoustic wave relative to the incident acoustic wave is either 0° or 180°. If the incident acoustic wave is moving from a medium with low acoustic impedance to a medium with higher acoustic impedance, then the phase shift is 0°. A phase shift of 180° for the reflected acoustic wave occurs for the reverse case of the incident acoustic wave going from a high acoustic impedance medium into a low acoustic impedance medium.

Unlike the case of a simple interface between two media, the presence of an intermediate layer between a pair of media yields a frequency dependent phase shift between the incident acoustic wave and the retro-reflected acoustic wave. This phase shift varies with frequency, and is a function of both the thickness of the buffer layer, and the acoustic impedances of the three materials making up the two interfaces. The phase shift of the reflected wave is determined by equation 9 which is a function of the complex variable parameter $Z_{layer}$.

Thus, the current wisdom in the art is that the presence of such an intermediate layer will add very significant complications to the optimal performance of the acoustic transducer, with no expectation of improving the bandwidth of the transducer in operation. The present invention contradicts current wisdom by demonstrating that significant enhancements can be made to the transmission bandwidth of an acoustic transducer when an intermediate (buffer) layer is added according to certain conditions.

In a first of its aspects, the invention may provide an electroacoustic transducer, comprising a piezoelectric part comprising a piezoelectric material having a first acoustical impedance and an acoustical thickness, a substrate part comprising a material having a second acoustical impedance, and an intermediate part comprising a material having a third acoustical impedance and at least partially sandwiched between the piezoelectric part and the substrate part for acoustical communication therewith. The first acoustical impedance and the second acoustical impedance each has a respective value within a range of values for which the value of the third acoustical impedance is an extreme limit. The third acoustical impedance may be an upper limit if the aforesaid acoustical thickness is less than $0.4\Lambda$, or may be a lower limit if the aforesaid acoustical thickness is greater than $0.4\Lambda$, where $\Lambda$ is an acoustical wavelength in the material of the piezoelectric part.

The acoustical thickness of the piezoelectric part may be within the range $0.2\Lambda$ to $0.4\Lambda$ where $\Lambda$ is an acoustical wavelength in the material of the piezoelectric part. The value of the third acoustical impedance may then be an upper limit to the range of values at that acoustical wavelength ($\Lambda$).

The acoustical thickness of the piezoelectric part may be within the range $0.4\Lambda$ to $0.6\Lambda$ where $\Lambda$ is an acoustical wavelength in the material of the piezoelectric part. The value of third acoustical impedance may then be a lower limit to the range of values at that acoustical wavelength ($\Lambda$).

The value of the first acoustical impedance may be less than the value of the second acoustical impedance.

The acoustical thickness of the intermediate part sandwiched between the piezoelectric part and the substrate part may be less than $0.2\Lambda$ where $\Lambda$ is an acoustical wavelength in the material of the intermediate part.

Improvements in the fractional frequency bandwidth may be obtained/revealed due to an intermediate part (buffer layer) when the Smith Chart plot of the electrically impedance matched transducer's electrical response in the absence of an intermediate part does not yield a loop or kink in the Complex impedance response as plotted on the Smith Chart. The absence of a kink or loop in the Smith Chart plot may often occur, for example, when the acoustic impedance of the piezoelectric layer is either less than or alternatively equal to the acoustic impedance of the substrate. Significant improvements in the electrically matched bandwidth may be achieved when the addition of an intermediate part excites a kink, or better still a small loop, in the electrically matched transducer's Smith Chart response. Examples of this effect are for example illustrated in Figures herein and described below. The intermediate part is preferably acoustically thin (e.g. of thickness<<one acoustic wavelength within the part).

The successful excitation of a kink or loop in the Smith Chart plot for a given intermediate part may dependent on the various acoustic impedance combinations of the substrate part, the piezoelectric part and the intermediate part. This is described herein in terms of the "wall rule" or "well rule".

For example, if the piezoelectric layer of the transducer has a width of about 0.3Λ (e.g. from about 0.2Λ to about 0.4Λ), then the following arrangements may be employed. The buffer layer may be arranged to form an acoustical impedance 'wall' between the piezoelectric layer and the main substrate layer. Amongst these three layers, the piezoelectric layer may have the lowest acoustical impedance, the substrate layer may have a higher acoustical impedance, but the buffer layer may have the highest acoustical impedance. Alternatively, the buffer layer may form an acoustical impedance 'wall' between the piezoelectric layer and the main substrate layer whereby the piezoelectric layer has lowest acoustical impedance, the substrate layer may have substantially the same acoustical impedance as the piezoelectric layer, but the buffer layer may have the highest acoustical impedance. Alternatively, the buffer layer may form an acoustical impedance 'wall' between the piezoelectric layer and the substrate layer, whereby the piezoelectric layer has higher acoustical impedance than the substrate layer, and the buffer layer has the highest acoustical impedance. In this way, a general rule (the "Wall Rule") is found to be that if the width of the piezoelectric layer is about 0.3Λ (e.g. from about 0.2Λ to about 0.4Λ), the buffer layer forms an impedance 'wall'.

Alternatively, for example, if the piezoelectric layer of the transducer has a width of about 0.5Λ (e.g. from about 0.4Λ to about 0.6Λ), then the following arrangements may be employed. The buffer layer may be arranged to form an acoustical impedance 'well' between the piezoelectric layer and the main substrate layer. Amongst these three layers, the buffer layer may have the lowest acoustical impedance, the piezoelectric layer may have a higher acoustical impedance, but the substrate layer may have the highest acoustical impedance. Alternatively, the buffer layer may form an acoustical impedance 'well' between the piezoelectric layer and the main substrate layer whereby the buffer layer is lowest acoustical impedance, the substrate layer may have substantially the same acoustical impedance as the piezoelectric layer. Alternatively, the buffer layer may form an acoustical impedance 'well' between the piezoelectric layer and the substrate layer, whereby the piezoelectric layer has higher acoustical impedance than the substrate layer, and the buffer layer has the lowest acoustical impedance. In this way, a general rule (the "Well Rule") is found to be that if the width of the piezoelectric layer is about 0.5Λ (e.g. from about 0.4Λ to about 0.6Λ), the optimal buffer layer for frequency bandwidth performance should form an impedance 'well'.

As can be seen, there exists a range (ΔZ) of acoustical impedance values in which each of the piezoelectric layer acoustical impedance ($Z_p$), the substrate layer acoustical impedance ($Z_S$) and the buffer layer acoustical impedance (Zb) reside, wherein Zb forms one extreme limit of that range. If Zb forms the upper limit, then the width (Lp) of the piezoelectric layer may preferably be about 0.3Λ (e.g. 0.2Λ to 0.4Λ) thick. Whereas, if Zb forms the lower limit, then the width (Lp) of the piezoelectric layer may preferably be about 0.5Λ (e.g. 0.4Λ to 0.6Λ) thick.

A further benefit of exciting a loop in the Smith Chart plot is that the resistive impedance variation of the electrically matched transducer will be reduced over much of the 2:1 VSWR frequency bandwidth of the transducer compared to the alternative case where there is no loop in the Smith Chart plot. This may reduce the resistive dispersion of a central frequency band (e.g. 20 MHz or more, e.g. 40 MHz) centred at the frequency of interest (e.g. about 0.1 GHz), as illustrated in examples herein. A reduced variation in the electrical resistive impedance $Z_r$ is highly beneficial as it yields a reduced variation in the acoustic power emitted by the transducer as a function of frequency when driven by a constant voltage V power source such as for example by an Operational Amplifier with low output electrical impedance. The reason for this is that the acoustic power developed by the transducer will be proportional to $V^2/Z_r$. So, reducing the variation in $Z_r$ can be extremely beneficial. This is another reason why the use of an intermediate layer can be highly beneficial.

Accordingly, the electroacoustic transducer may be arranged to be driven to generate an acoustic signal of acoustic frequency within the frequency range of about 90 MHz to about 110 MHz. Desirably, the resulting maximum relative change in electrical resistive impedance (e.g. resistance) of the transducer is less than about 25%. This 'relative' change refers to when the transducer is driven to generate an acoustic signal of any given acoustic frequency within the frequency range relative to the electrical resistive impedance of the transducer when driven at any other acoustic frequency within said frequency range. This preferably applies to any acoustic frequency within that frequency range, such that the maximum relative change, at whatever frequency it happens to occur within the frequency range, is less than about 25%, as described above. Preferably, the relative change in electrical resistive impedance (i.e. resistance) of the transducer is less than about 20%, or more preferably less than about 15%, or more preferably less than about 10%, or more preferably less than about 5%. Preferably, the acoustical impedance of the substrate part is not less than the acoustical impedance of the piezoelectric part. It has been found that the beneficial effects of the invention, in terms of a more stable resistance value, are especially evident when this conditions is met. The electrical resistive impedance in question may be in respect of the transducer when electrically matched.

The maximum relative change in electrical resistive impedance (i.e. resistance) of the transducer may be defined as a resistance 'contrast' (P), where:

$$P=(R_{MAX}-R_{MIN})/(R_{MAX}+R_{MIN})\times 100\%$$

and $R_{MAX}$ and $R_{MIN}$ are, respectively, the maximum and minimum values of the electrical resistive impedance to occur within the frequency range.

In a second aspect, the invention may provide an acoustic data transceiver system, comprising a first electroacoustic transducer as described in an aspect of the invention above, wherein the first electroacoustic transducer is utilized as a data transmitter or a data receiver.

In the data transceiver system, the first electroacoustic transducer may be bonded to a solid transmission medium, via which medium data can be transmitted and/or received by the first electroacoustic transducer.

In the data transceiver system, the data transceiver may be provided with a second electroacoustic transducer as described above, the first and second electroacoustic transducers being bonded to substantially opposite ends or sides of the solid transmission medium, to allow for acoustic data transmission between the first and second electroacoustic transducers via the solid transmission medium.

The power and/or data transceiver system may comprise first and second electroacoustic controllers associated with, respectively, the first and second electroacoustic transducers, for: controlling the first or second electroacoustic transducer to generate an acoustic signal, for transmitting power and/or data to the second or first electroacoustic transducer, via the solid transmission medium, using that signal; and/or receiving power and/or data from the first or second electroacoustic transducer as a result of the first or second electroacoustic transducer receiving that signal.

BRIEF DESCRIPTION OF THE DRAWINGS

FIG. 3 schematically illustrates an exploded view of a plurality of acoustic transducers according to an embodiment of the invention, as applied to a MIMO data transmission system of FIG. 2;

FIG. 7 schematically illustrates a Mason equivalent circuit model suitable for modelling embodiments of the invention, which accurately represents the conversion of electrical signals by the piezoelectric transducer into mechanical signals and vice versa;

FIGS. 8A and 8B show the Insertion Loss (solid black curve) and Transmission Loss (dotted curve) responses as a function of frequency of an acoustic transducer both with a buffer layer according to an embodiment of the invention (FIG. 8B) and without a buffer layer (FIG. 8A). The source impedance at the output of the transformer in FIG. 6 in these calculations was 300 Ohms in both cases. This high electrical impedance, in this case and the those described below, is merely a consequence of the small electrode area of the transducers (of 0.2 mm×1 mm) investigated in this analysis, which is intended to be illustrative and not limiting. Electrical Insertion loss plots illustrate the impact of a thin fused silica reflective buffer layer on the electrical impedance response between 40 MHz and 140 MHz for an μ½λ thick (thickness at 100 MHz) 36°Y cut lithium niobate transducer bonded to a single crystal C-axis orientated sapphire substrate. A better than 2:1 VSWR match between 80 MHz and 120 MHz (the solid black traces) is achieved with a buffer layer but not when the layer is absent. The predicted bandwidth (40.5 MHz) improvement produced by the reflective buffer layer is a factor of 2.07 better. The thickness of the piezoelectric platelet is 0.541λ at 100 MHz in both cases;

FIG. 12A corresponds to a 4.8 μm thick gold buffer layer (being ~1/6.75λ thick at 100 MHz). FIG. 12B corresponds to a 16.1 μm thick buffer layer (being ~½λ thick at 100 MHz). A 4.8 μm thick gold buffer layer (FIG. 12A) has the same acoustic power reflectivity at 100 MHz as a 3.2 μm thick fused silica layer. However, no kink or loop is excited within the Smith Chart plot of FIG. 12A within the target frequency band of 80 MHz and 120 MHz (the solid black traces). This is due to the difference in the phase shift upon reflection of an acoustic wave off a gold buffer layer;

DETAILED DESCRIPTION OF EMBODIMENTS

Figure 1:
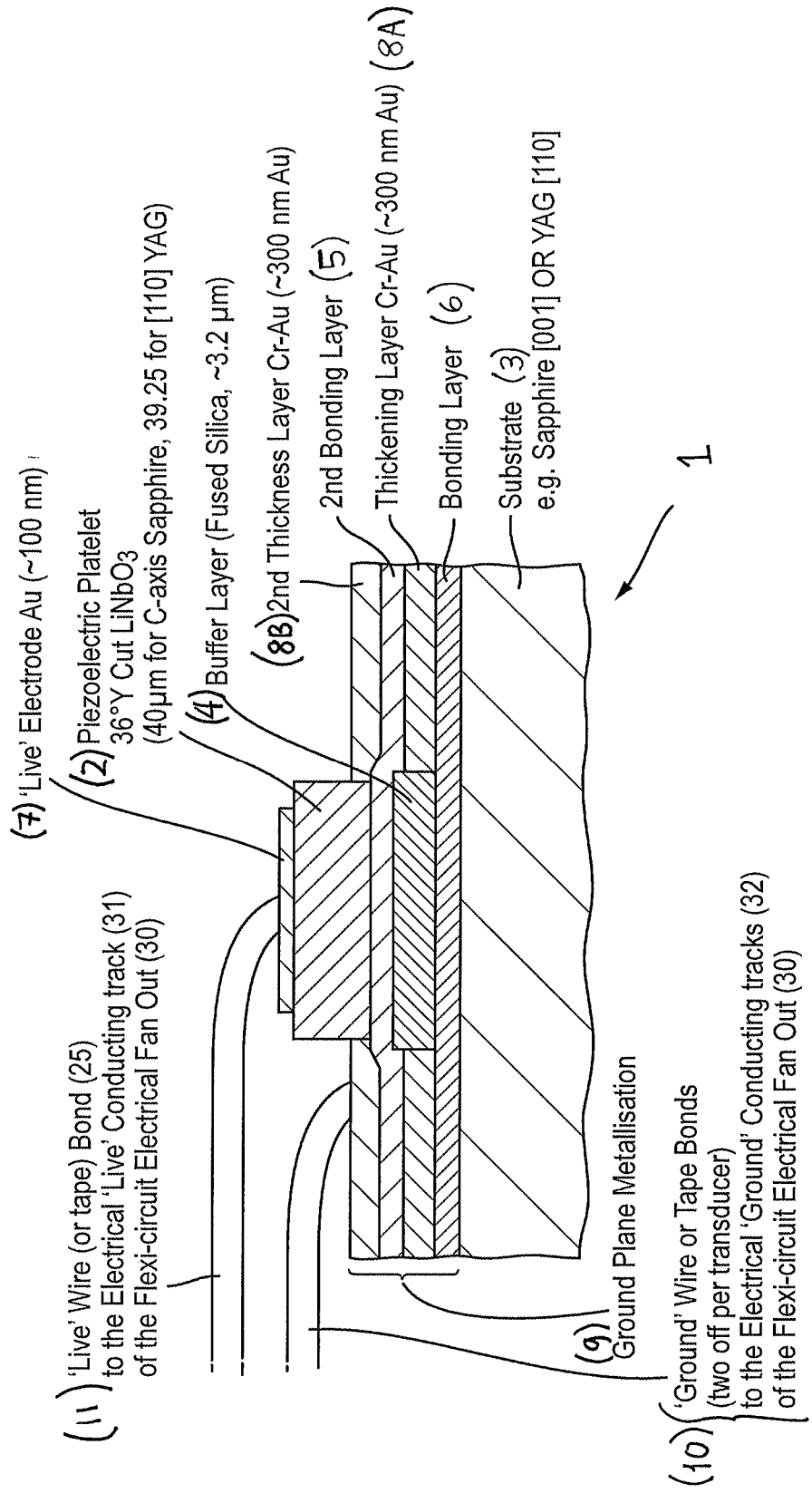
FIG. 1 schematically illustrates an acoustic transducer according to an embodiment of the invention.

FIG. 1 schematically shows a cross-sectional view of a transducer apparatus 1 according to an embodiment of the invention.

The transducer apparatus comprises a 36°Y cut lithium niobate piezoelectric platelet layer 2 bonded to a C-axis orientated block of single crystal sapphire substrate layer 3. An intermediate layer 4, hereafter is also referred to as a buffer layer, of fused silica is sandwiched between the piezoelectric layer 2 and the substrate layer 3. The piezoelectric layer is about 0.5Λ thick (e.g. between 0.4Λ thick and 0.6Λ thick, at 100 MHz). At an acoustic frequency of 100 MHz, this corresponds to about 40 µm thick. The buffer layer is 3.2 µm thick (different thicknesses are employed in different embodiments). The presence of the buffer layer has been found to improve the electrically matched 2:1 VSWR fractional bandwidth ($\Delta f/f_c$) of the transducer by a factor of approximately two for an acoustic band-centre frequency ($f_c$) of 100 MHz. It is to be noted that the acoustic impedance of the fused silica buffer layer is smaller than the acoustic impedance of either the lithium niobate piezoelectric layer or the sapphire substrate layer.

However, in other embodiments the acoustic impedance of the material of the buffer layer (e.g. gold) may higher than the acoustic impedance of the material of both the piezoelectric layer and the substrate layer. This has also been found to yield a similar large fractional bandwidth. In those circumstances, most preferably the acoustical thickness of the piezoelectric layer is about 0.3Λ thick (e.g. between 0.2Λ thick and 0.4Λ thick, at 100 MHz).

A thin (about 70 nm thickness) bonding layer 5 of gold (Au) between extremely thin (~10 nm thickness) chrome keying layers resides between the opposing faces of the piezoelectric layer 2 and the buffer layer 4, and bonds the one to the other. Another thin (about 70 nm thickness) bonding layer 6 of gold (Au) between extremely thin (~10 nm thickness) chrome keying layers resides between the opposing faces of the buffer layer 4 and the substrate layer 3, and also serves to bond the two layers together. The electrically conductive bonding layers (5, 6) for the transducer may be vacuum cold-welded layers. The cold-weld layer, for processing reasons, is standardised at a 70 nm thick layer, and uses a chrome 'flash' of thickness ~10 nm as a keying layer to the dielectric media that are being bonded together. Other thicknesses for the cold-weld bonding layer are possible.

A first and second thickening layers (8A, 8B), each about 300 nm thick and formed from gold (Au), extend between the two bonding layers at either side of the buffer layer (thereby forming one thickening layer), and over the second the surface of the uppermost bonding layer 5 either side of the piezoelectric layer 2. Collectively, the two bonding layers (5, 6) and the two associates thickening layers 8, define a structure of ground-plane metallisation layers 9 of the transducer. The role of the thickening layers is to reduce the film electrical resistance to the ground plane electrode of the transducer, and to protect the thin bonding layers from being abraded by loose abrasive particles when polishing the buffer layer, and subsequently the piezoelectric layer, to their respective final target thicknesses for a given transducer design. Other thicknesses for these thickening layers are possible, the main limitation is to keep the layer sufficiently thin that stresses in the metal film do not result in the layer peeling off, a significant risk for film layers>1 µm thick.

An electrode 7 is formed in electrical contact with an outer plane surface of the piezoelectric layer 2 for imparting electrical signals into, or receiving electrical signals from, the piezoelectric material of the piezoelectric layer. A signal transmission line/wire/track 11 is arranged in electrical contact with the electrode 7 to place the electrode in electrical communication with drive circuitry (not shown) arranged for delivering/receiving electrical signals to/from the electrode. The electrode 7 is arranged for transceiving electrical signals to/from the piezoelectric layer. This forms the electrical excitation electrode of the transducer structure. Its thickness may be about 100 nm which yields negligible mechanical loading of the overall resonant transducer structure.

A ground line/wire/track 10 is arranged in electrical contact with the ground plane metallisation layer 9 and concurrently in electrical communication with a ground terminal (not shown). The arrangements for electrical communication with drive circuitry and a ground terminal may be as would be readily apparent to the skilled person, and may be according to normal practice in the art.

For the specific case of the transducer design presented in FIG. 1, the reflectivity of the buffer layer, for incident sound, is about 16.6% when the c-axis sapphire substrate 3 is employed. In other embodiments, the substrate material may be un-doped YAG and the reflectivity of the buffer layer is then about 15%. Importantly, the impact upon the total reflectivity of the intermediate layer, caused by the presence of the acoustically extremely thin Au bonding layers (5, 6) is negligible and can be ignored.

The transducer structure of FIG. 1, and other preferred embodiments of the invention, is designed to operate over the acoustical frequency range 80 MHz to 120 MHz. The 36°Y cut lithium niobate piezoelectric plate layer 2, of the transducer is a crystal cut for launching high frequency longitudinal polarised acoustic waves. At the centre frequency of 100 MHz this piezoelectric plate is ~0.54 acoustic wavelengths (Λ) thick and is bonded to a sapphire substrate. This optimal thickness of the piezoelectric layer 2 is determined according to whether the acoustic impedance of the piezoelectric layer is smaller than or larger than the acoustic impedance of the substrate layer 3. The optimal thickness is also determined according to whether the acoustic impedance of the buffer layer is smaller than or larger than the acoustic impedance of both the piezoelectric layer 2 and the substrate layer 3. Piezoelectric materials other than lithium niobate may be used. The substrate 3 into which acoustic waves are to be launched by the transducer, may be either a single crystal YAG [110] or sapphire [001] substrate. Other substrate materials are possible. The acoustic thickness of the buffer layer in this particular transducer design is equivalent to 1/18.65 acoustic wavelengths (Λ) at the band centre frequency $f_c$ of 100 MHz. This optimal material for the buffer layer is optimised according to the acoustic impedances of the piezoelectric layer 2 and the substrate layer 3.

Figure 2:
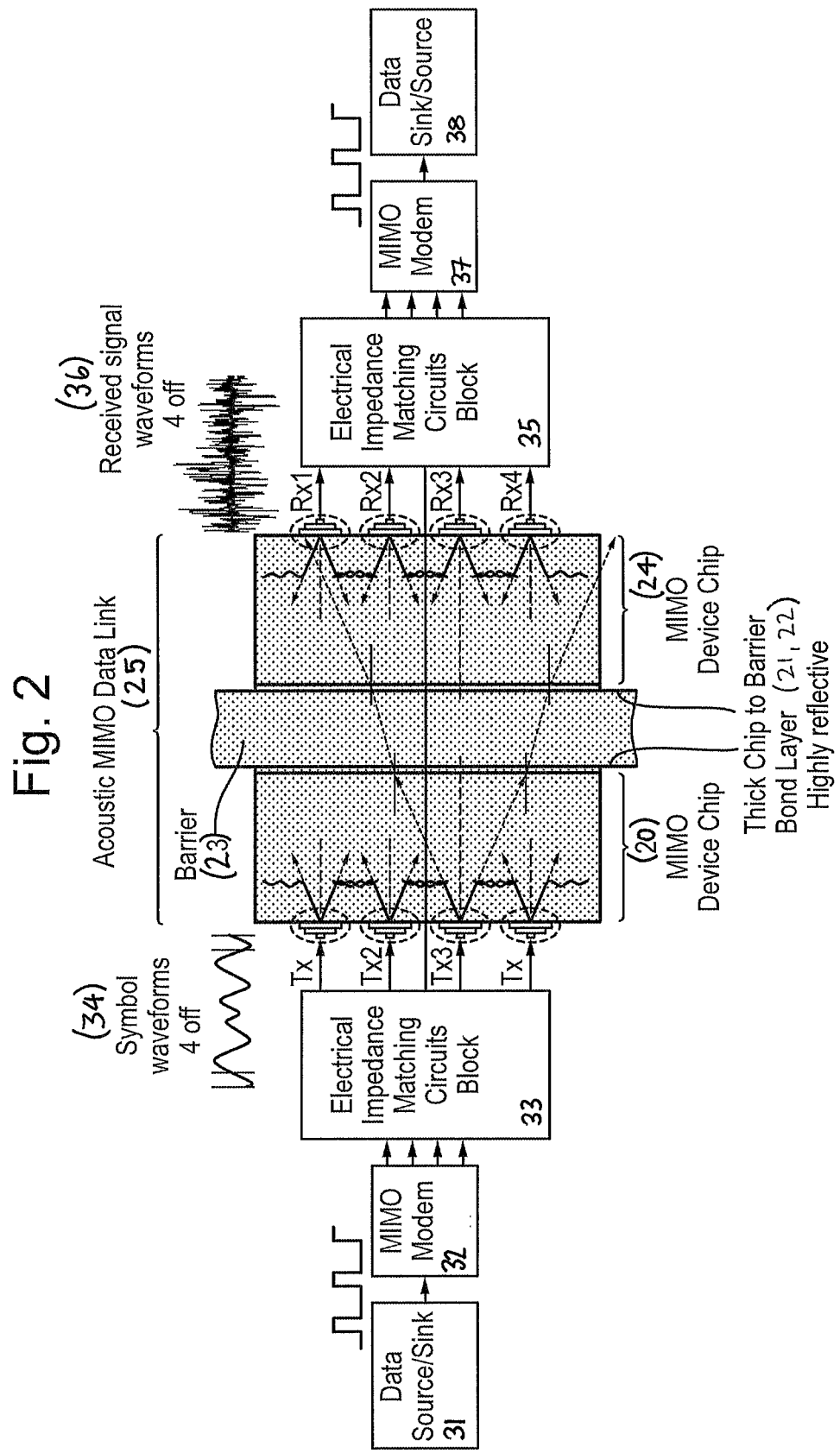
FIG. 2 schematically illustrates a plurality of acoustic transducers according to an embodiment of the invention, applied to a MIMO data transmission system.

The transducer of FIG. 1 may be employed, for example, in a communications or data transfer link, such as is shown in FIG. 2. In particular, FIG. 2 schematically shows one possible configuration for a MIMO (multiple input, multiple output) OFDM (orthogonal frequency-division multiplexing) communications link (25). A data source/sink unit (31, 38) provides/receives digital data to/from a MIMO model unit (32, 37) which, in turn provides/receives four OFDM channel signals to/from an electrical impedance matching circuit block (33, 35).

When in transmit mode, a transmitting MIMO device chip 20 as shown in the left-hand part of FIG. 2, receives four transmission symbol waveforms (34) from the matching circuits block (33) on four transmit channels (Tx). These are received by the transmitting MIMO chip 20 at four respective electro-acoustical transducers each of which is as shown in FIG. 1. When in receive mode, a receiving MIMO device chip 24 as shown in the right-hand part of FIG. 2, receives transmission symbol waveforms (34) from the transmitting MIMO device chip 20. These are received at four respective electro-acoustical transducers each of which is as shown in FIG. 1, and are output to a matching circuits block (35) on four receiver channels (Rx). These four received signals are transmitted from the impedance matching circuit block (35) to a MIMO modem (37) where they are combined and decoded into a digital signal which is passed to a data sink/source unit. Of course, the arrangement can be operated in reverse order, whereby parts described above in transmission mode may operate in receive mode, and vice versa.

Each electro-acoustical transducer (1) is mounted on separate MIMO Device Chips (20, 24), and each MIMO Device Chip is mounted on a respective one of two opposite surfaces/sides of a barrier (23)—one on each surface. The MIMO Device Chips are bonded nominally directly opposite one another, using a barrier bonding layer (21, 22). The barrier may be, for example, a 5 mm thick section of ballistic grade aluminium (Def. Stan. 95-22 Class 1 (7017)). The MIMO Device Chips each comprise a block of low acoustic loss dielectric material which provides a reverberation chamber to support the creation of a complex acoustic signal multipath environment.

FIG. 3 shows a closer view of one of the MIMO Device Chips. In this embodiment, the MIMO Device Chip is bonded to the barrier (23) using an adhesive layer (21, 22). Four nominally identical transducers (1A, 1B, 1C and 1D) are bonded to a substrate (20) at a regular linear pitch of 1.6 mm in this embodiment. The transducers in each MIMO Device Chip are used to either launch for example COFDM (Coded Orthogonal Frequency Division Multiplexing) encoded acoustic signals or receive them. The width of the transducer electrodes in this design are made very narrow (e.g. 0.2 mm wide) to ensure that rapidly diffracting acoustic waves are launched into the MIMO Device Chip along the angular direction parallel to the transverse centre axis of the transducer electrode array launching acoustic signals. This helps to provide the complex signal multipath needed to support spatially orthogonal acoustic data streams across the data link.

The data source/sink (31, 32) at any one side of the barrier 23 of FIG. 2 together with the MIMO modem (32, 37) and electrical impedance matching circuit (33, 35) collectively define a respective first and second electroacoustic controllers associated with, respectively, the first and second electroacoustic transducers (Tx, Rx). These controllers serve to control the first or second electroacoustic transducer to generate an acoustic signal, for transmitting power and/or data to the second or first electroacoustic transducer, via the solid transmission medium of the barrier (23), using that signal. Additionally, or in the alternative, the first and second electroacoustic transducers (Tx, Rx) serve to control the first or second electroacoustic transducer to receive data from the first or second electroacoustic transducer as a result of the first or second electroacoustic transducer receiving that signal. Thus, power may be transmitted from the first electroacoustic transducer (Tx) to the second electroacoustic transducers (Rx), or vice versa.

The frequency bandwidth required for a given use of the transducer, is set by the both the required data rate to be transmitted, and the smaller number n or m of supportable orthogonal spatial data streams emitted by the transmit transducer array of n elements and receive transducer array of m elements. If data rates of less than 300 Mbps are required then this can be achieved using a frequency bandwidth of 20 MHz if also combined with a transmitter and receiver array consisting of 4 transducers each, see Table 1. However, a 40 MHz bandwidth combined with 4 orthogonal spatial data streams could support a much higher data rate of up to 600 Mbps using for example the LTE communications protocol. Note that a non-MIMO communications system using one transmit and one receive transducer could be employed. However, that would require a larger frequency bandwidth to support the same data rates. A target frequency bandwidth of 40 MHz is therefore advantageous using a 4×4 transducer arrays MIMO system, in cases where it is desirable to allow data transmission rates of up to 600 Mbps.

TABLE 1

Data rates (Max) versus bandwidth for different configurations.

| No of spatial streams | Channel Width | | | |
|---|---|---|---|---|
| | 20 MHz | 40 MHz | 80 MHz | 160 MHz |
| 1 | 78 Mbps | 180 Mbps | 390 Mbps | 780 Mbps |
| 2 | 156 Mbps | 360 Mbps | 780 Mbps | 1.56 Gbps |
| 3 | 234 Mbps | 540 Mbps | 1.17 Gbps | 2.34 Gbps |
| 4 | 312 Mbps | 720 Mbps | 1.56 Gbps | 3.12 Gbps |
| 8 | 624 Mbps | 1.44 Gbps | 3.12 Gbps | 6.24 Gbps |

The lower limit on the operational centre frequency $f_c$ for the transducer is restricted by the requirement that the fractional bandwidth of the transducer $\Delta f/f_c$ must be less than an octave. Otherwise $(f_1+f_2)$ intermodulation products, and similarly second harmonic generation signal products, will fall within the operational 40 MHz bandwidth. Such intermodulation products would compromise the high linearity required for OFDM acoustic waveforms. The linearity required will be a function of the modulation scheme employed. Thus, preferably the minimum recommended centre frequency for the transducer is 60 MHz (=40 MHz/0.666).

The operational centre frequency requirement of >60 MHz now allows a candidate piezoelectric material to be down selected. A piezoelectric material that exhibits low acoustic losses at frequencies>40 MHz is required. A suitable choice is 36°Y cut congruent melt lithium niobate. This synthetic crystal is well-established and efficiently generates longitudinal polarised acoustic waves at multiple GHz frequencies. It also has an exceptionally high Curie temperature of 1410° C. One significant property of 36°Y cut lithium niobate is its relatively small relative dielectric constant of 39, which means that its electrical impedance is much higher than other transducers of a comparable size. Its piezoelectric coupling coefficient $k_t$ of 0.487 restricts the typical, achievable fractional bandwidth $\Delta f/f_c$ of the transducer to about 50%. The selection of a 36°Y cut lithium niobate piezoelectric layer therefore restricts the minimum centre frequency of the transducer to approximately ≥80 MHz.

The maximum recommended centre frequency $f_c$ of the transducer is set by the transmission losses of the acoustic wave as it propagates across the barrier. Acoustic attenuation losses in dB/cm in a material increase as function of frequency f at a rate of $f^n$ where n is greater than 1 and less than or equal to 2. The increase in acoustic attenuation with increasing frequency is slightly offset to a degree by acoustic diffraction losses for signal transmission across a barrier; acoustic diffraction losses across a barrier fall in the acoustic far field with increasing frequency at a rate of 6 dB per octave.

The total transmission losses and their variation with frequency will therefore be dependent on the barrier material and its thickness. The maximum permissible acoustic transmission loss will be a function of the signal to noise performance of the system at the communications channel receiver. The maximum permissible loss slope across the frequency band of operation of a communications channel is fundamentally a function of the dynamic range of the signal detection electronics. For a COFDM (Coded Orthogonal Frequency Division Multiplex) signal protocol, a 20 dB slope across the frequency band of operation is taken as a good rule of thumb guideline.

The barrier material employed in the present embodiment is a 5 mm thick barrier of ballistic grade aluminium which has a measured acoustic attenuation of $9.12 \times 10^{-4}$ dB/cm/MHz$^2$. The acoustic attenuation loss across the 5 mm barrier varies from ~1.6 dB at 60 MHz to ~6.6 dB at 120 MHz. Therefore, a target centre frequency of 100 MHz was selected. A 36°Y cut transducer operating at a centre frequency of 100 MHz is best bonded with a vacuum cold weld bond to a highly polished crystalline or glass substrate. Evaporated gold films of thickness 70 nm were used on each optically polished surface to be bonded. A keying layer of 10 nm of chrome provides a good keying surface to the substrate to which the gold will then adhere. Other metals such as for example indium could be used in place of gold, and other thicknesses of gold can likewise be used.

The target thicknesses of the transducer layers was determined by acoustic modelling using a proprietary software programme based on the equivalent circuit Mason model described below with reference to FIG. 7.

FIG. 3 also illustrates the far field acoustic diffraction envelopes (300) that each emanate from an associated transducer Tx (1A to 1D). The intensity variation of the far field acoustic diffraction patterns as a function of the angle θ from the bore sight of any given transducer electrode of width D is given by:

$$I(\theta) = Sinc^2\left(\frac{\pi D f \sin(\theta)}{V_a}\right)$$

Here, f is the frequency of operation, and $V_a$ is the acoustic velocity equal to about 11,000 m/s along the C-axis of single crystal sapphire. The near field Rayleigh distance representing the boundary between near field diffraction and far field diffraction is shown in FIG. 3. The transition from the near field where the acoustic beam remains approximately collimated, to the far field where the beam diverges occurs at about 0.44 mm from each transducer at 120 MHz, and at an even shorter distance at 80 MHz. This Rayleigh distance in an acoustically isotropic medium is given by:

$$L_R = \frac{fD^2}{V_a}$$

The full angular width of the far field central diffraction lobe to the zero intensity points is equal to the angle $2\theta_1$ shown in FIG. 3. The full angular width $2\theta_1$ varies from 86.8° at 80 MHz to 54° at 120 MHz within the sapphire crystal blank. Acoustic refraction at the first bond interface (21) reduces the corresponding angular width $2\theta_1$ of the central diffraction lobe to 46° at 80 MHz, and 30° at 120 MHz. A second refraction process occurs at the second bond interface (22) again increases the full angle angular spread of the central lobe to 86.8° at 80 MHz to 54° at 120 MHz within the second sapphire crystal blank as illustrated in FIG. 3.

At this point, it is instructive to return again to the nature of the acoustical impedances of the piezoelectric layer, the buffer layer and the substrate layer of each of the acousto-electrical transducers (1A to 1D) of FIG. 3 and FIG. 1, alike. The following analysis enables a fuller understanding of the invention, in terms of the relative acoustical impedances of the parts of the transducer(s).

Figure 6:
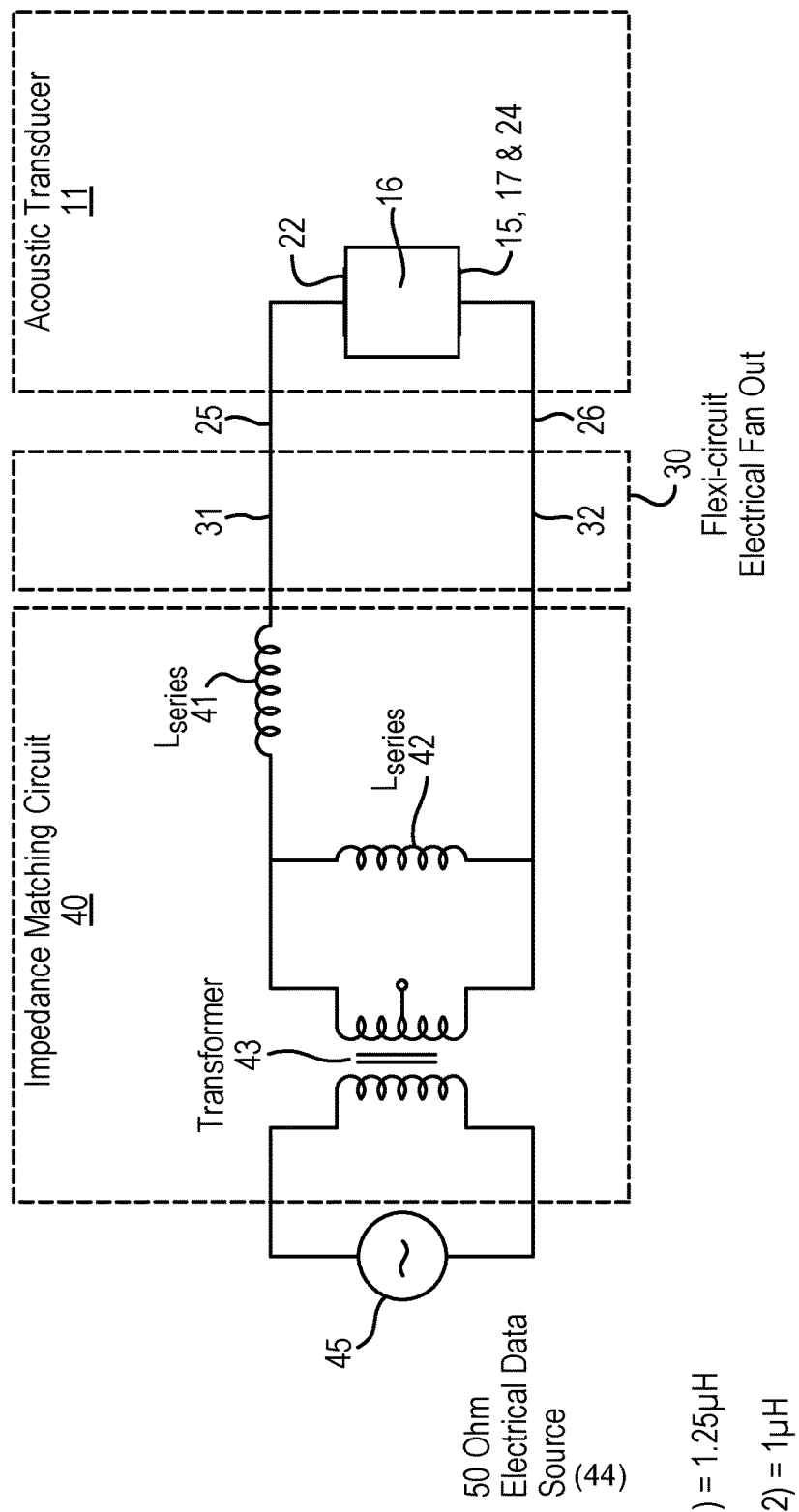
FIG. 6 schematically illustrates a circuit diagram of an electrical matching circuit for electrically impedance matching an electrical source to the transducer of FIG. 1.

FIG. 6 shows the schematic circuit diagram of the electrical matching circuit (40) used in the analysis to electrically impedance match the electrical source (45) to the transducer (11) of embodiments of the invention shown in FIG. 1. This particular circuit electrically matches a 50 Ohm electrical data source (44) to the acoustic transducer (11) which has a much higher electrical impedance. The transducers described in this document are optimised for a wide bandwidth MIMO (Many Inputs/Many Outputs) acoustic device by reducing its active area to 0.2 mm² to create a highly diffracting acoustic beam within the main substrate. However the innovation of a buffer layer to enhance the bandwidth of transducer could be also employed for a more conventional transducer.

The electrical matching circuit (40) comprises a tuning inductor (41) that is connected in series directly to the transducer's live electrode. The role of this inductor is to partially cancel out at the highest frequencies of the required bandwidth of the transducer the net capacitive electrical reactance of the high electrical impedance transducer. After tuning the reactance at the upper frequency band edge of the transducer should typically be greater than $-0.5 Z_{ref}$ and less than $\sim +0.2 Z_{ref}$. Here $Z_{ref}$ is the reference output impedance at the output of the transformer (43). The resistive impedance of the acoustic transducer (11) at every frequency point would, with an ideal inductor (41), be unchanged by this series tuning inductor. A shunt tuning inductor (42) is connected between the electrical ground electrode (24) of the transducer and the series tuning inductor (41). The previous tuning of the acoustic transducer (11) by the series inductor (41) will typically result in the semi tuned transducer response being still strongly capacitive over the lower half of the required band of operation. The purpose of the shunt tuning inductor (42) is to improve the cancellation of the net capacitive electrical reactance of the transducer to achieve values again lying within the 2:1 VSWR circle of the Smith Chart plot for the system. The shunt tuning inductor (42) will also transform the net resistive impedance of the tuned acoustic transducer (11), with the largest changes occurring at lower frequency band edge of the transducer. A high frequency transformer (43) is used to complete the electrical matching network. Its role is to transform the source impedance of the source (44) to the load impedance of the acoustic transducer after tuning with the series and parallel inductors (41) and (42).

The inductor values and the turns ratio of the transformer in circuit (40) would be individually tailored for the transducer structure and materials employed. This would involve using tuning methodologies well known to those who are expert in the field of acoustic transducer design. For example the tuning strategy outlined above of a series tuning inductor, followed by a shunt tuning inductor, followed by a transformer to the signal source is appropriate for an un-tuned transducer whose initial electrical impedance is both resistively and reactively very high relative to the source impedance. Different tuning strategies would be appropriate for a much larger area transducer of lower electrical impedance.

A flexi-circuit electrical fan out (30) electrically connects the terminals of the impedance matching circuit (40) to the terminals of the acoustic transducer (11).

All of the electrical impedance matching results presented herein are based on modelled data, and their electrical matching circuits for a given source electrical impedance. The transducer structures are modelled using the well-known Mason equivalent circuit model which accurately represents the conversion of electrical signals by the piezoelectric transducer into mechanical signals and vice versa. An outline description of the Mason Model is given below with reference to FIG. 7. The impact of the buffer layer was modelled by adding transmission line sections between the ground electrode and the substrate.

Figure 4A:
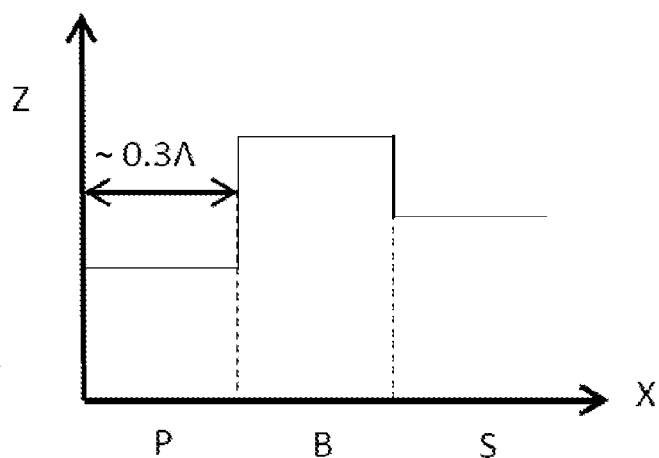
FIGS. 4A, 4B and 4C graphically illustrate a variety of different spatial distributions (the 'Wall Rule') of acoustical impedance values of component materials/layers of an acoustic transducer according to an embodiment of the invention.

FIG. 4A schematically illustrates acoustical impedances (Z) of a transducer according to an embodiment of the invention, plotted as a function of notional depth (X) into the acoustic transducer, through the three layers perpendicular to their planes. The buffer layer (B) is arranged to form an acoustical impedance (Z) 'wall' between the piezoelectric (P) layer and the main substrate (S) layer. Amongst these three layers, the P layer has the lowest Z, the S layer has a higher Z, but the B layer has the highest Z.

Figure 4B:
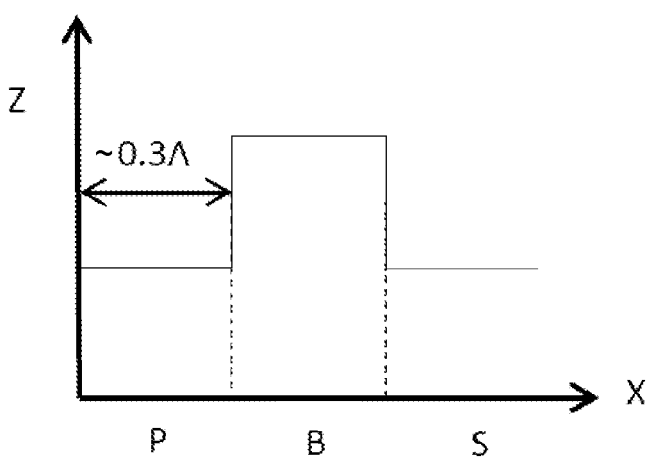

Alternatively, FIG. 4B schematically illustrates acoustical impedances (Z) of a transducer according to another embodiment of the invention, plotted as a function of notional depth (X) into the acoustic transducer, through the three layers perpendicular to their planes. Here, the buffer layer (B) forms an acoustical impedance 'wall' between the piezoelectric (P) layer and the main substrate (S) layer whereby the P layer is lowest Z, the S layer has substantially the same Z as the P layer, but the B layer has the highest Z.

Figure 4C:
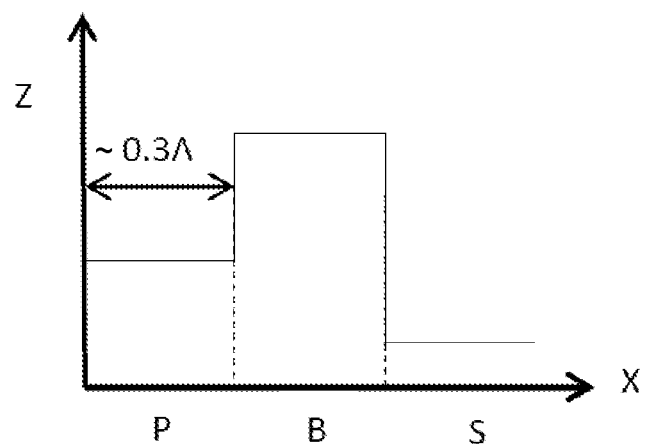

Alternatively, FIG. 4C schematically illustrates acoustical impedances (Z) of a transducer according to yet another embodiment of the invention, plotted as a function of notional depth (X) into the acoustic transducer, through the three layers perpendicular to their planes. In this example, the buffer layer (B) forms an acoustical impedance 'wall' between the piezoelectric (P) layer and the substrate (S) layer, whereby the P layer has higher Z than the S layer, and the B layer has the highest Z. This illustrates a general rule (the "Wall Rule") that if the width of the P layer is about 0.3Λ (e.g. from about 0.2Λ to about 0.4Λ), the B layer form an impedance 'wall'.

Figure 5A:
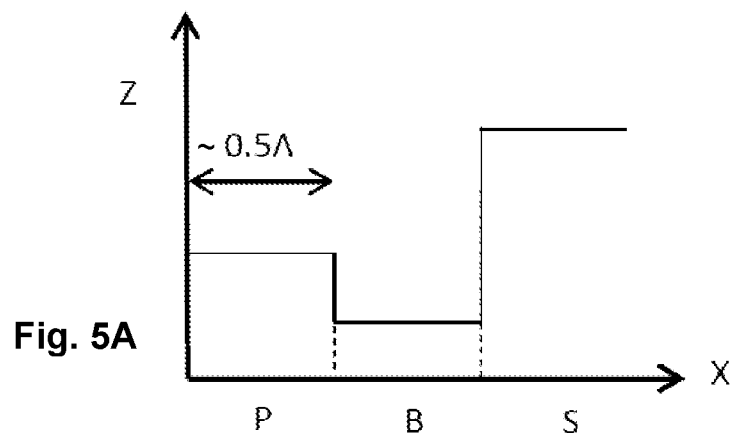
FIGS. 5A, 5B and 5C graphically illustrate a variety of different spatial distributions (the Well Rule') of acoustical impedance values of component materials/layers of an acoustic transducer according to an embodiment of the invention.

FIG. 5A schematically illustrates acoustical impedances (Z) of a transducer according to another embodiment of the invention, plotted as a function of notional depth (X) into the acoustic transducer, through the three layers perpendicular to their planes. Here, the piezoelectric layer of the transducer has a width of about 0.5Λ (e.g. from about 0.4Λ to about 0.6Λ). The buffer layer (B) is arranged to form an acoustical impedance 'well' between the piezoelectric (P) layer and the main substrate (S) layer. Amongst these three layers, the buffer layer has the lowest acoustical impedance, the piezoelectric layer has a higher acoustical impedance, but the substrate layer has the highest acoustical impedance.

Figure 5B:
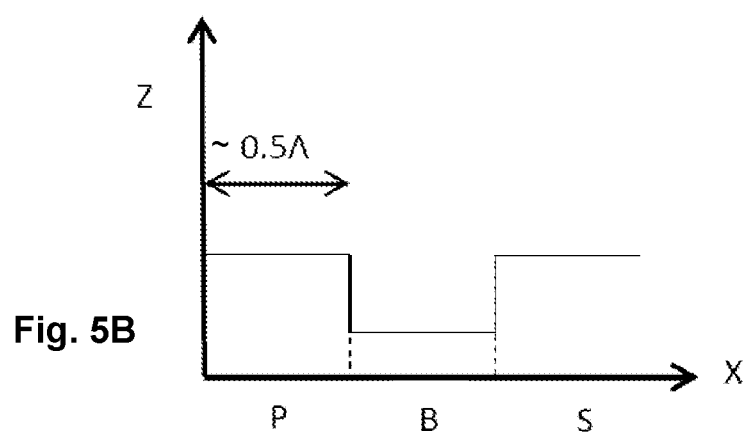

Alternatively, FIG. 5B schematically illustrates acoustical impedances (Z) of a transducer according to another embodiment of the invention, plotted as a function of notional depth (X) into the acoustic transducer, through the three layers perpendicular to their planes. Here, the buffer layer forms an acoustical impedance 'well' between the piezoelectric layer and the main substrate layer whereby the buffer layer has the lowest acoustical impedance, the substrate layer has substantially the same acoustical impedance as the piezoelectric layer.

Figure 5C:
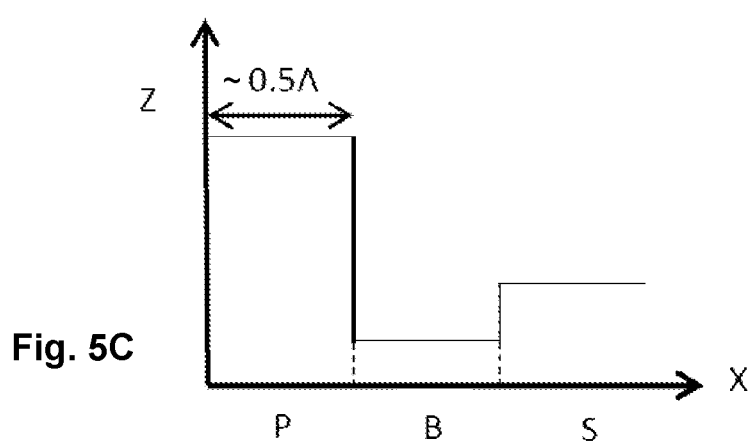

Alternatively, FIG. 5C schematically illustrates acoustical impedances (Z) of a transducer according to another embodiment of the invention, plotted as a function of notional depth (X) into the acoustic transducer, through the three layers perpendicular to their planes. In this case, the buffer layer forms an acoustical impedance 'well' between the piezoelectric layer and the substrate layer, whereby the piezoelectric layer has higher acoustical impedance than the substrate layer, and the buffer layer has the lowest acoustical impedance. This illustrates a general rule (the "Well Rule") that if the width of the piezoelectric layer is about 0.5Λ (e.g. from about 0.4Λ to about 0.6Λ), the buffer layer should form an impedance 'well'.

These examples convey the property of the invention, that there exists a range (ΔZ) of acoustical impedance values in which each of the piezoelectric layer acoustical impedance ($Z_p$), the substrate layer acoustical impedance ($Z_S$) and the buffer layer acoustical impedance (Zb) reside, wherein Zb forms one extreme limit of that range. If Zb forms the upper limit, then the width (Lp) of the piezoelectric layer may preferably be about 0.3Λ (e.g. 0.2Λ to 0.4Λ). Whereas, if Zb forms the lower limit, then the width (Lp) of the piezoelectric layer may preferably be about 0.5Λ (e.g. 0.4Λ to 0.6Λ). When subject to these conditions, the invention has been found to provide a very significant increase in the 2:1 VSWR fractional bandwidth ($\Delta f/f_c$) of signal transmission and also a significant reduction in the dispersion/variation (also called 'contrast' herein) of the resistive impedance of the electrically matched transducer over much of the 2:1 VSWR frequency bandwidth. These benefits are discussed in more detail below. A significant improvement in the transducer's fractional bandwidth $\Delta f/f_c$ is achieved when a buffer layer is used. A particularly beneficial effect of the buffer layer on the fractional bandwidth $\Delta f/f_c$ of the transducer is obtained when the thickness of the piezoelectric layer is desirably chosen as listed below:

'about' 0.5Λ at the transducers target centre frequency for a buffer layer material of acoustic impedance smaller than both the piezoelectric layer and the main substrate (the 'well rule').

'about' 0.3Λ at the transducers target centre frequency for a buffer layer material of acoustic impedance larger than both the piezoelectric layer and the main substrate (the 'wall rule').

These piezoelectric layer thicknesses are rough guidelines and during the optimisation of the transducer design may be further refined to achieve the optimal thickness for the piezoelectric layer. The above criteria are met for the designs highlighted in Tables 1A, 1B and 1C; and Tables 1Aa, 1Bb and 1Cc; and 2. These tables summarise three acoustic impedance configuration combinations which are now described in Cases 1, 2 and 3 below.

Tables 1A, 1B and 1C each tabulate the 2:1 VSWR fractional bandwidth ($\Delta f/f_c$) of signal transmission, and the Power Reflection Coefficient R, at various interface structures between the piezoelectric transducer platelet (36°Y cut lithium niobate) and various acoustic substrates. The table also indicates the acoustic thickness of the piezoelectric layer and the buffer layer in acoustic wavelengths at a nominal target centre frequency of 100 MHz.

Tables 1Aa, 1Bb and 1Cc each tabulate the dispersion/variation (called 'contrast' in these tables) of the resistive impedance of the electrically matched transducer over much of the 2:1 VSWR frequency bandwidth.

Table 2 tabulates the densities, acoustic velocities, and acoustic impedances of sample materials employed in the structures referred to in Tables 1A, 1B and 1C, and Tables 1Aa, 1Bb and 1Cc. Values of the acoustic power reflection coefficient R and the reflection coefficient r for different interfaces are presented in Tables 1A, 1B and 1C and in Table 2, respectively. The SI units of acoustic impedance are kg $m^{-2}$ $s^{-1}$. However acoustic impedance is often expressed in units of MRayls where 1 MRayl=$10^6$ kg $m^{-2}$ $s^{-1}$.

Referring first to Tables 1A, 1B and 1C, these summarise the results of a detailed set of transducer modelling calculations on the impact of different buffer layer on the fractional bandwidth $\Delta f/f_c$ of the transducers. The results are grouped as follows:

Table 1A: Case 1 configurations—a 36°Y lithium niobate transducer bonded to a higher acoustic impedance substrate, either C-axis Sapphire or [110] YAG. The acoustic impedance of the piezoelectric layer is lower than the main substrate. The acoustic impedance of the Buffer layer is either smaller or larger than both.

Table 1B: Case 2 configurations—a 36°Y lithium niobate transducer bonded to an equal acoustic impedance substrate, i.e. 36°Y lithium niobate. The acoustic impedance of the piezoelectric layer is equal to the main substrate, and the acoustic impedance of the Buffer layer is either smaller or larger than both.

Table 1C: Case 3 configurations—a 36°Y lithium niobate transducer bonded to a lower acoustic impedance substrate, either fused silica, or a hypothetical glass (herein called 'glass 1') with an acoustic velocity set equal to that of fused silica but with twice its density. The acoustic impedance of the piezoelectric layer is higher than the main substrate, and the acoustic impedance of the Buffer layer is either smaller or larger than both. The references to 'Glass 1' are a reference to a hypothetical material used to the model in the impact of a buffer layer made from either fused silica or alternatively gold on the frequency bandwidth of a transducer bonded to a main substrate (Glass 1) whose acoustic impedance was less than that of the piezoelectric transducer but twice that of fused silica. The acoustic velocity of Glass 1 was made equal to that of fused silica, but its density was set to be double that of fused silica.

Structures with buffer layers that provide an improved fractional bandwidth $\Delta f/f_c$ over that achieved without a buffer layer structure, are identified by Bold Font cells. These are each grouped with results (identified by Italic Font within cells) where a different thickness of buffer layer does not yield an improvement, and with results for a transducer having no buffer at all.

Case 1: Piezoelectric Layer Whose Acoustic Impedance is Less than that of the Main Substrate.

The beneficial effect of a suitable buffer layer on the frequency bandwidth of a transducer is demonstrated for two different substrates in FIGS. 8A, 8B, 9A, and 9B, and in FIGS. 10A, 10B, 11A and 11B, respectively. The results for a C-axis orientated single crystal sapphire main substrate are presented in 8A, 8B, 9A, and 9B, while those for a [110] orientated single crystal un-doped YAG main substrate is given in FIGS. 10A, 10B, 11A and 11B. The plots on the left show the transducer electrical insertion loss performance as a function of frequency achieved without a fused silica buffer layer. The plots on the right show the improved electrical insertion loss performance achieved with a fused silica buffer layer of acoustic thickness ~(1/18.65)Λ. Inspection of the plots shows that the 2:1 VSWR (≡9.54 dB) (VSWR=Voltage Standing Wave Ratio) matched bandwidth is a much larger for the transducer with a buffer layer of fused silica; by a factor of 2.07 for the sapphire substrate case, and by a factor of 1.9 for the YAG substrate case.

Figure 9A:
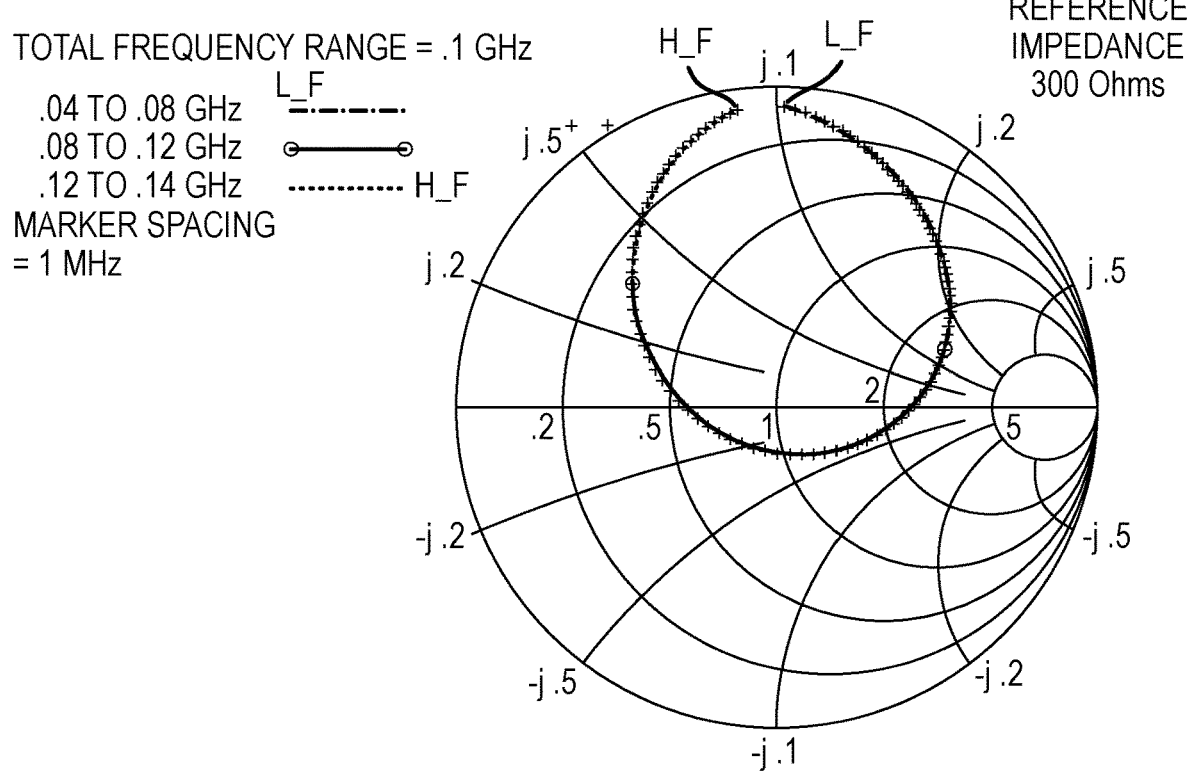
FIGS. 9A and 9B show the Smith Chart plots, corresponding to the spectra of FIGS. 8A and 8B, for the acoustic transducer both with a buffer layer according to an embodiment of the invention (FIG. 9B) and without a buffer layer (FIG. 9A). The Reference Impedance of the two Smith Chart plots is 300 Ohms.
Figure 9B:
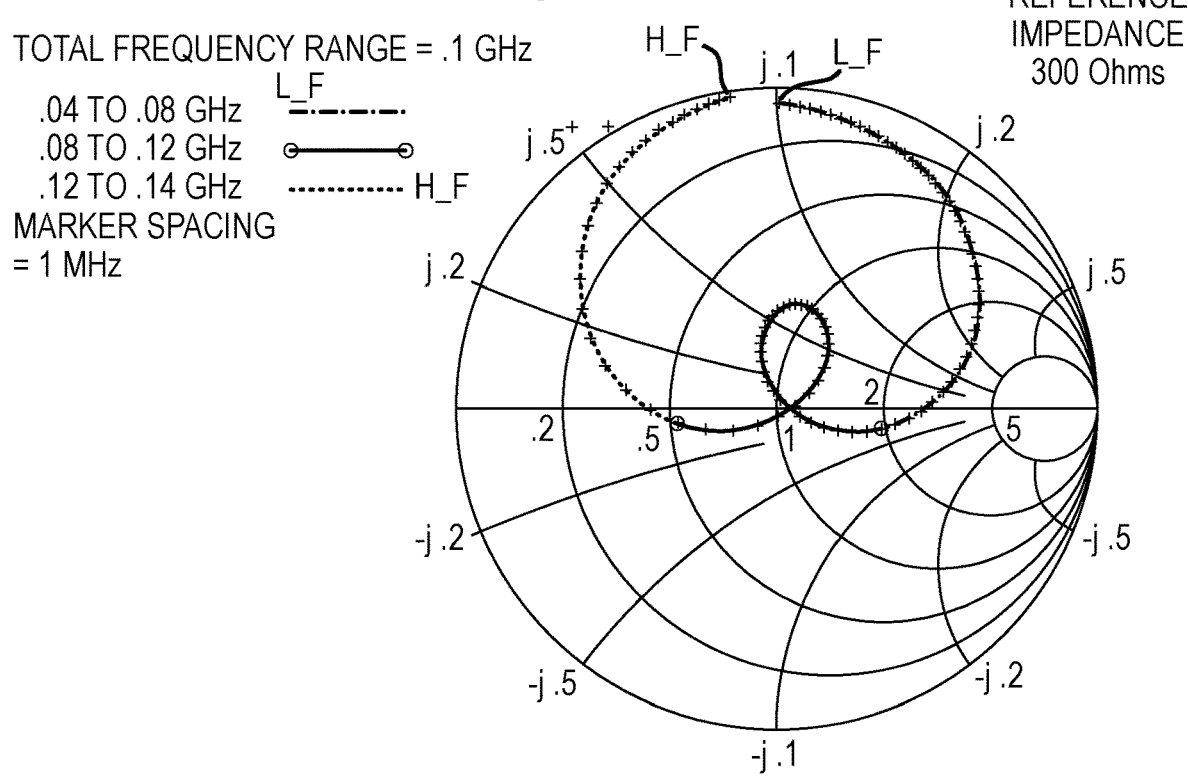
Figure 10A:
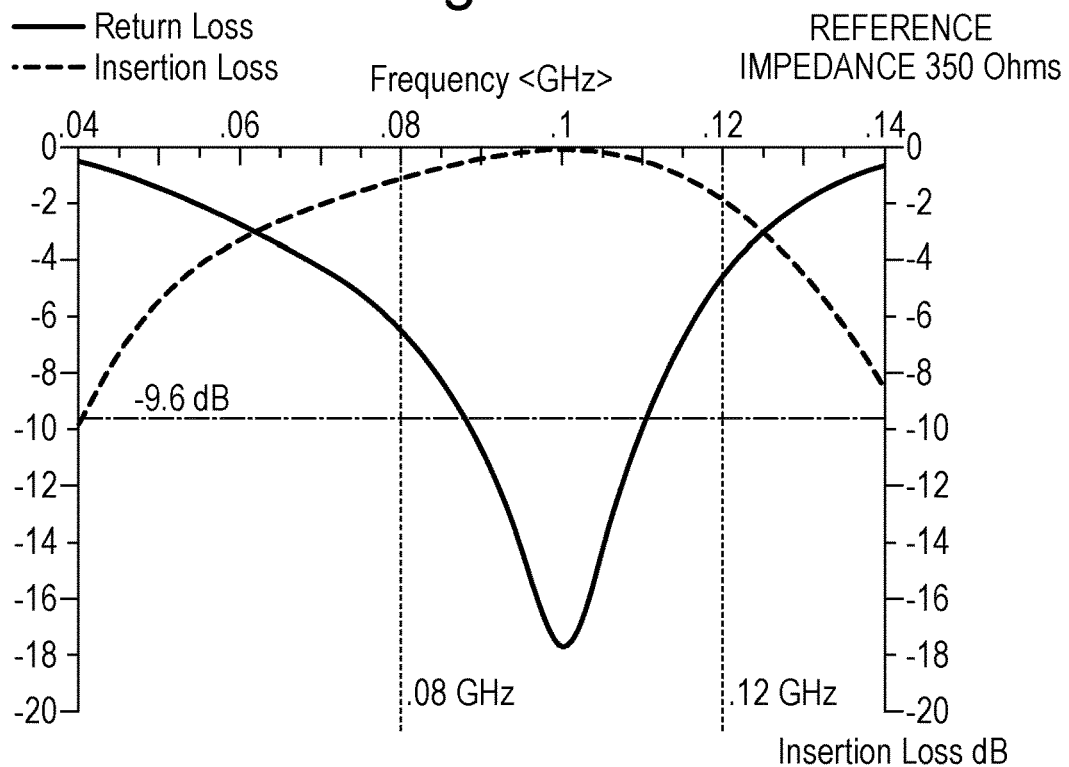
FIGS. 10A and 10B show the Insertion Loss and Transmission Loss responses as a function of frequency of an acoustic transducer both with a buffer layer according to an embodiment of the invention (FIG. 10B) and without a buffer layer (FIG. 10A). The source impedance at the output of the transformer in FIG. 6 in these calculations was 350 Ohms in both cases. Electrical Insertion Loss plots illustrate the impact of a thin fused silica reflective buffer layer on the electrical impedance response between 40 MHz and 140 MHz for an ~½ thick (thickness at 100 MHz) 36°Y cut lithium niobate transducer bonded to a single crystal [011] orientated un-doped YAG substrate. The transducer's Electrical Matched Response in FIG. 10B was calculated with a 3.2 μm thick (μ1/18.65λ thick at 100 MHz) fused silica buffer layer. The source Impedance at the output of the transformer is 350 Ohms. A better than 2:1 VSWR match between 80 MHz and 120 MHz (the solid black traces) is achieved with a buffer layer but not when the layer is absent. Better than 2:1 VSWR match is predicted between 78.1 MHz and 121 MHz, a bandwidth of 42.9 MHz.
Figure 10B:
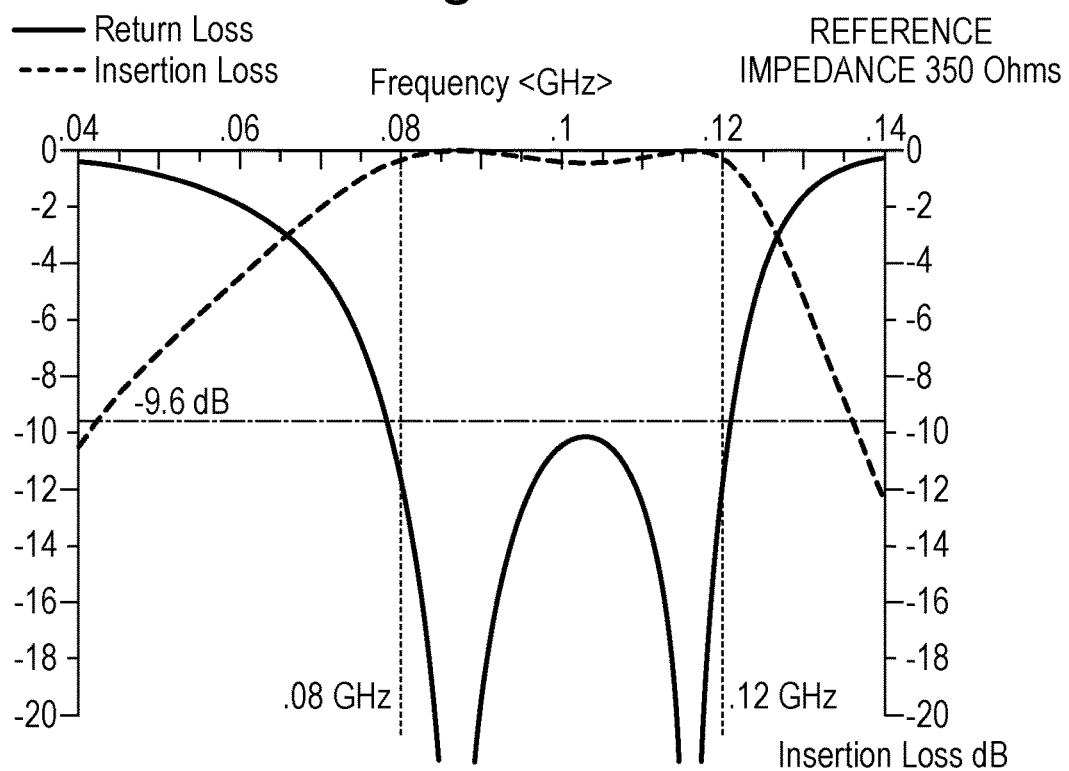
Figure 11A:
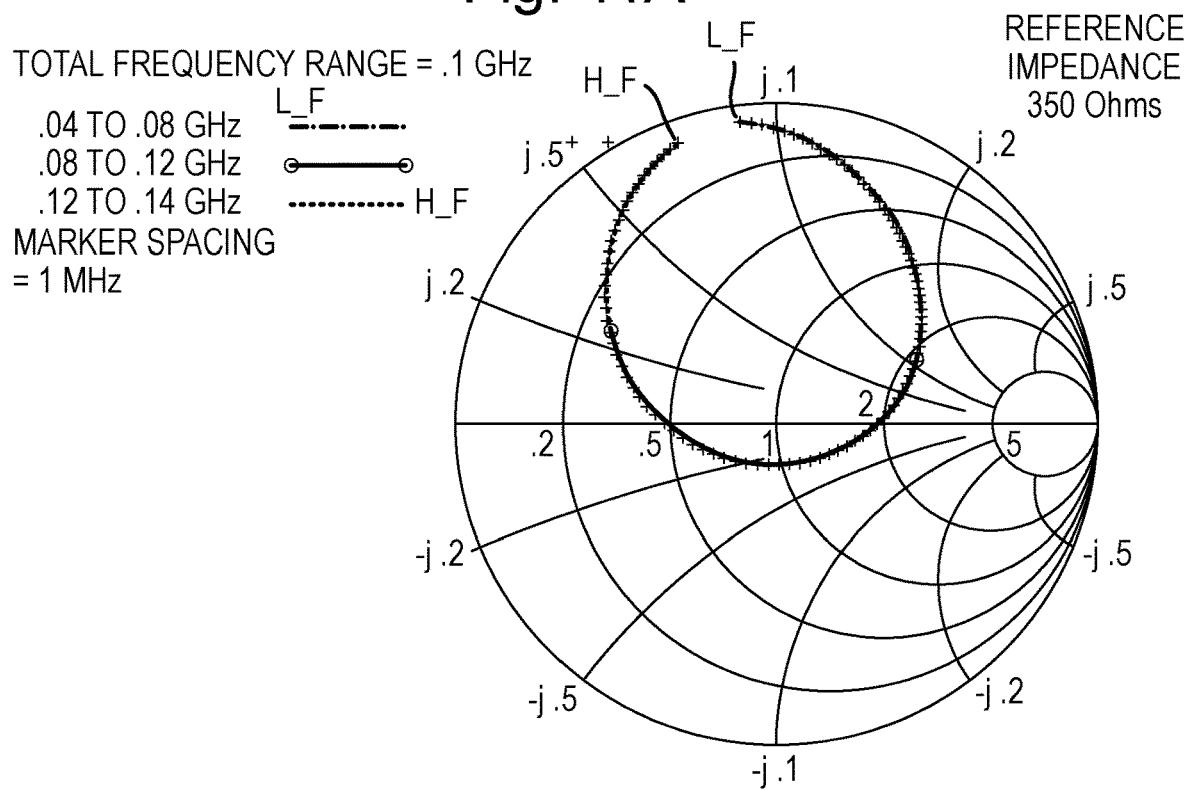
FIGS. 11A and 11B show the Smith Chart plots, corresponding to the insertion loss traces of FIGS. 10A and 10B, for the acoustic transducer both with a buffer layer according to an embodiment of the invention (FIG. 11B) and without a buffer layer (FIG. 11A). The Reference Impedance of the two Smith Chart plots is 350 Ohms.
Figure 11B:
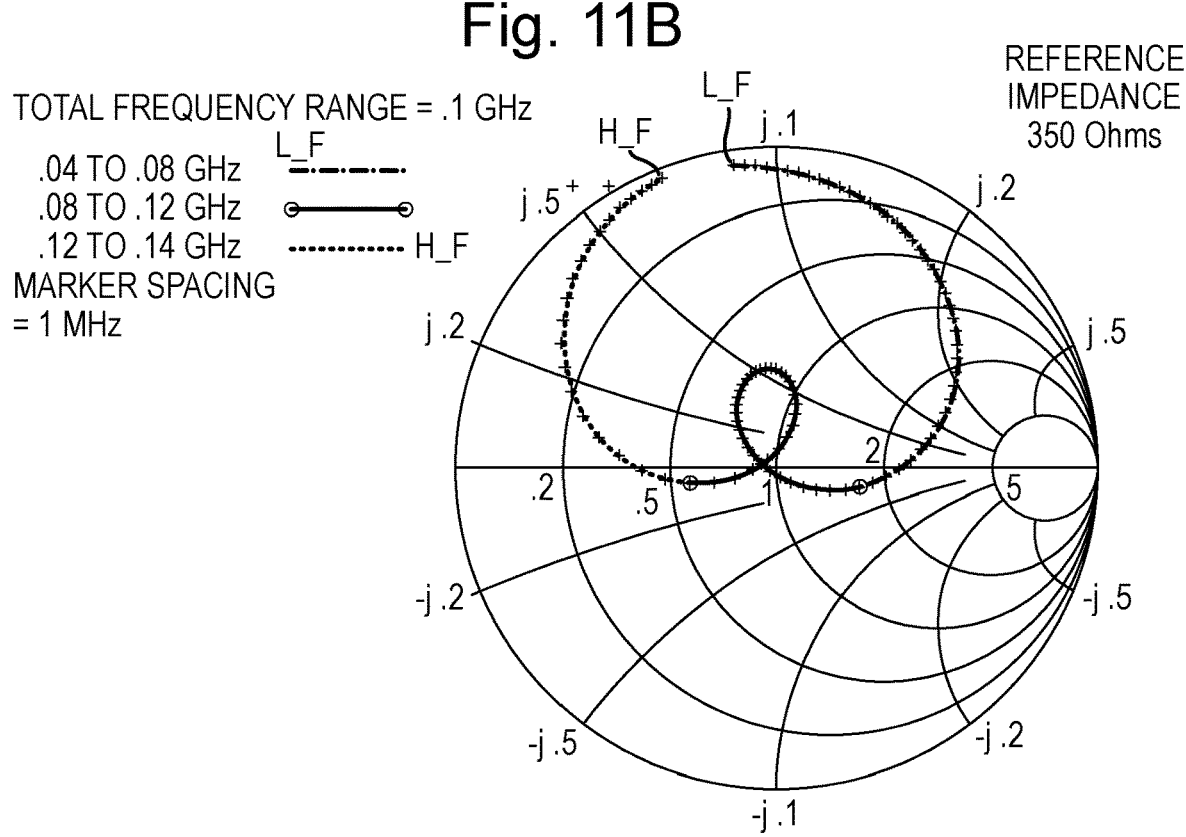

The Smith Chart plots in FIGS. 9A, and 9B (for a C-axis sapphire substrate), and likewise FIGS. 11A and 11B (for a [110] un-doped YAG substrate), indicate why a higher bandwidth is achieved with a buffer layer. Without a buffer layer the transducer exhibits a strongly dispersive variation of electrical impedance; it varies monotonically from high electrical impedance at the design's lower band-edge at 80 MHz to low electrical impedance at the design's upper band edge at 120 MHz. The buffer layer by comparison compresses the transducer's impedance dispersion over the majority of the target band of operation between 80 MHz and 120 MHz. It also creates a loop in the transducer's Smith Chart trace. The 2:1 VSWR circle on a Smith Chart plot has a major diameter that spans between the $Z_0$ (0.5+0j and $Z_0$ (2+0j) points on the Smith Chart plot. Every complex impedance point within the 2:1 VSWR circle is electrically matched to the reference impedance $Z_0$ to better than 2:1 VSWR. The reference source impedance $Z_0$ for these plots was respectively 300 Ohms in 9A, and 9B, and 350 Ohms in 11A, and 11B.

The fractional bandwidth $\Delta f/f_c$ of the transducer structure of FIG. 1 that utilises 'about' 0.5Λ thick piezoelectric layer is not improved by using a buffer layer made from a very high acoustic impedance material. But it is improved if, instead of using an 'about' 0.5θ thick piezoelectric layer, the thickness of the piezoelectric layer is reduced to 'about' 0.3θ thick. A high acoustic impedance buffer layer material may be gold which has an acoustic impedance of 62.5 MRayls. Modelling a transducer design with an 'about' 0.5Λ thick piezoelectric layer shows that monotonically increasing the thickness of the gold bond layer from 0.07 μm does not yield any beneficial improvement in the fractional bandwidth $\Delta f/f_c$.

Figure 12A:
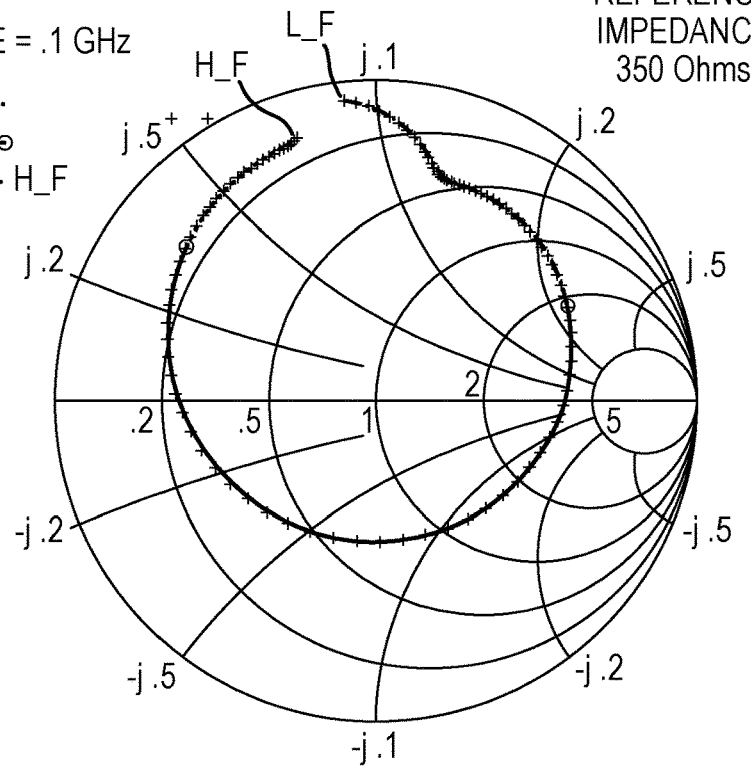
FIGS. 12A and 12B show the Smith Chart plots of an acoustic transducer both with a buffer layer of two different thicknesses, respectively. The Reference Impedance of the two Smith Chart plots is 350 Ohms. The Smith Chart plots illustrate the impact of a gold buffer layer on the electrical match of a ~½λ thick (thickness at 100 MHz) 36°Y cut lithium niobate transducer bonded to a single crystal [011] orientated un-doped YAG substrate for two different gold layer thickness.
Figure 12B:
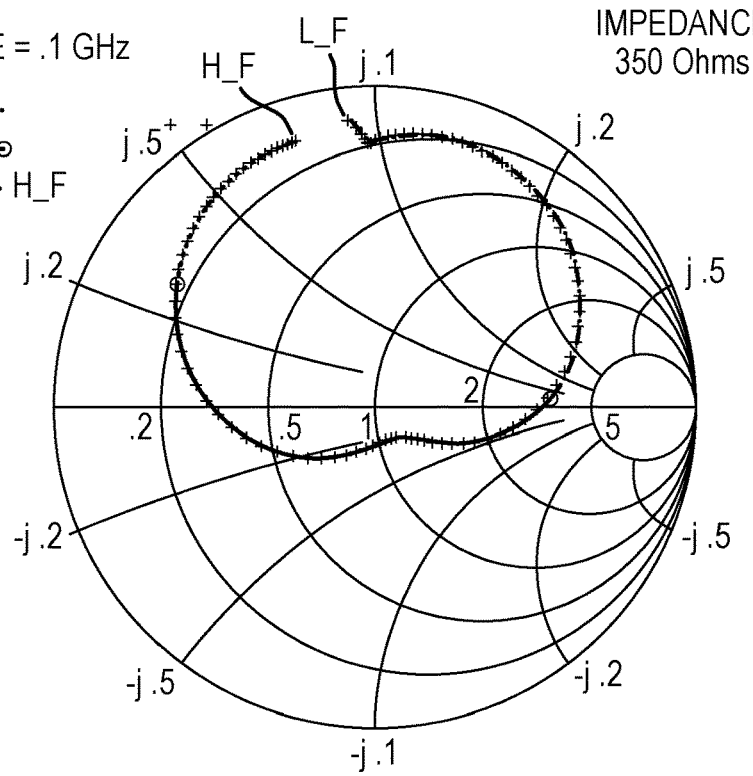

Similarly, increasing the gold buffer layer thickness does not induce any 'kink' or 'loop' in the Smith Chart plot trace until the thickness of the gold layer is ½ wave resonant thick, that is 16.1 μm thick at 100 MHz. These points are illustrated in FIGS. 12A and 12B. The plot of FIG. 12A shows the electrical impedance response for the case where the gold buffer layer is 4.8 μm thick which yields a power reflection coefficient R approximately equal to that obtained with a 3.2 μm thick fused silica layer. Unlike the fused silica case however, no loop in the electrical response within the 80 to 120 MHz frequency band is excited. When the gold buffer layer is increased to be ½-wave resonant in thickness, which corresponds to ~16.1 μm thick at 100 MHz, a kink is at last excited within the target operational frequency bandwidth of the transducer. However, even so there is still no beneficial improvement in the transducer frequency bandwidth with a large proportion of the target 80 MHz to 120 MHz bandwidth lying outside the 2:1 VSWR region of the Smith Chart plot.

Figure 13A:
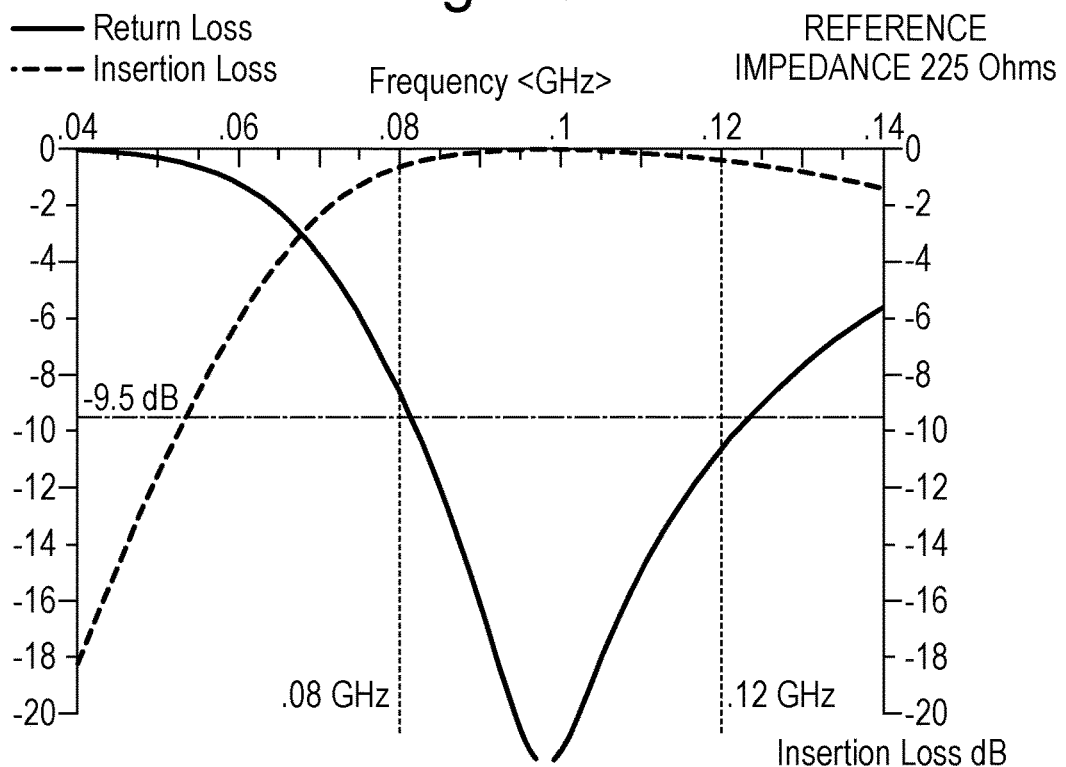
FIGS. 13A and 13B show the insertion loss and return loss responses as a function of frequency of an acoustic transducer both with a buffer layer according to an embodiment of the invention (FIG. 13B) and without a buffer layer (FIG. 13A). The source impedance at the output of the transformer shown in FIG. 7 in these calculations was 225 Ohms in FIG. 13A, and 255 Ohms in FIG. 13B. The Electrical Insertion loss plots illustrate the impact of an acoustically thin (~(1/8.1)λ thick at 100 MHz) Gold reflective buffer layer on the electrical impedance loss between 40 MHz and 140 MHz of a 36°Y cut lithium niobate transducer of thickness ~0.295λ (thickness at 100 MHz) when bonded to a single crystal C-axis orientated sapphire substrate. Electrical tuning circuits were individually optimised to achieve a better than 2:1 VSWR match over the maximum possible fractional bandwidth. The target centre frequency of the transducers was 100 MHz. A 2:1 VSWR electrically matched bandwidth of 53.5 MHz is achieved using the buffer layer. The source impedance at the output of the transformer was 255 Ohms.
Figure 13B:
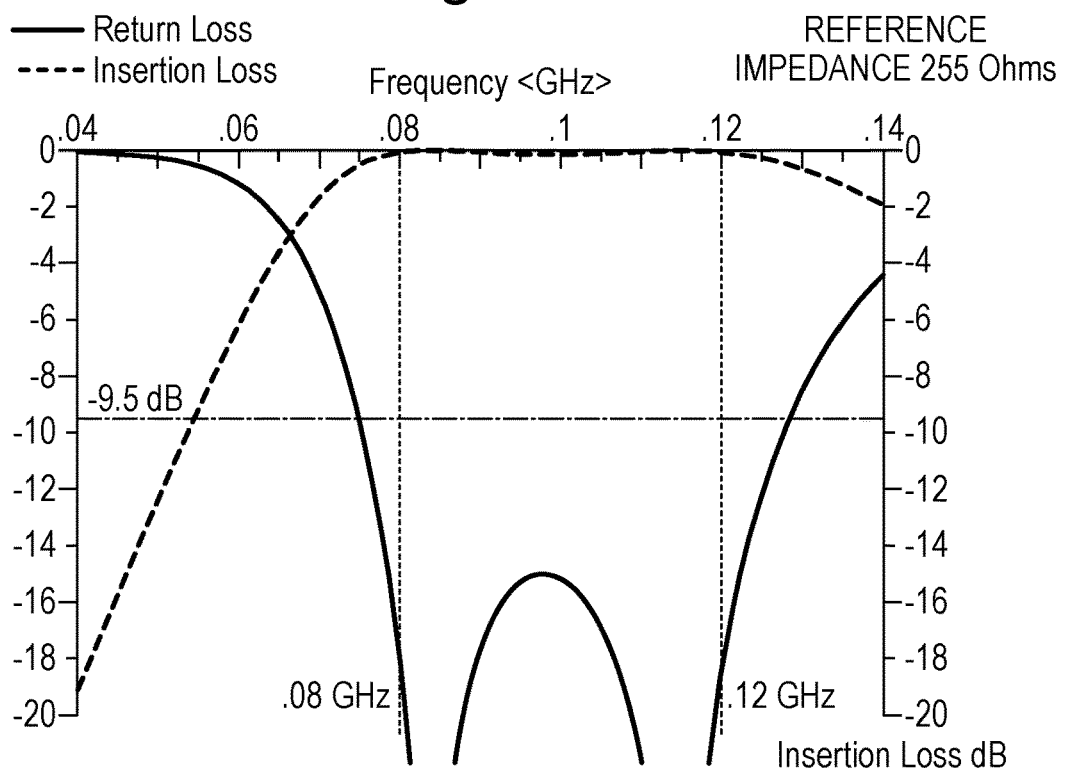
Figure 14A:
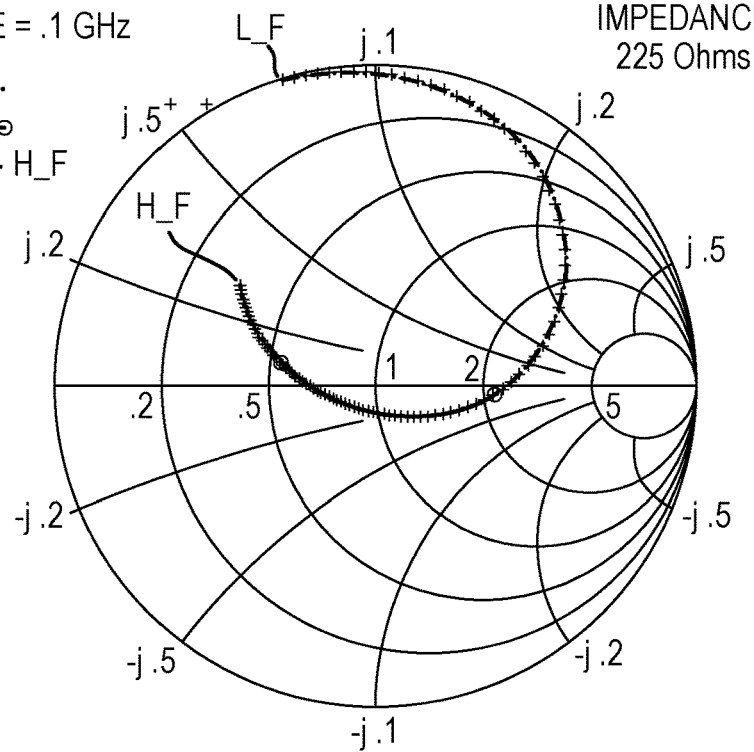
FIGS. 14A and 14B show the Smith Chart plots, corresponding to the Electrical Return Loss plots of FIGS. 13A and 13B, for the acoustic transducer both with a buffer layer according to an embodiment of the invention (FIG. 14B) and without a buffer layer (FIG. 14A). The Reference Impedance of the two Smith Chart plots is 225 Ohms for FIG. 14A, and 255 Ohms for FIG. 14B.
Figure 14B:
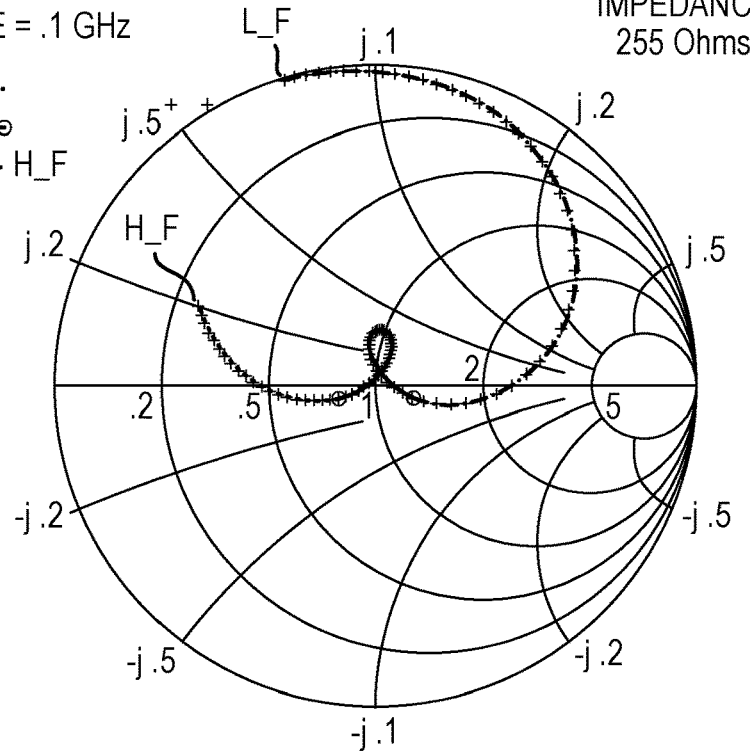
Figure 15A:
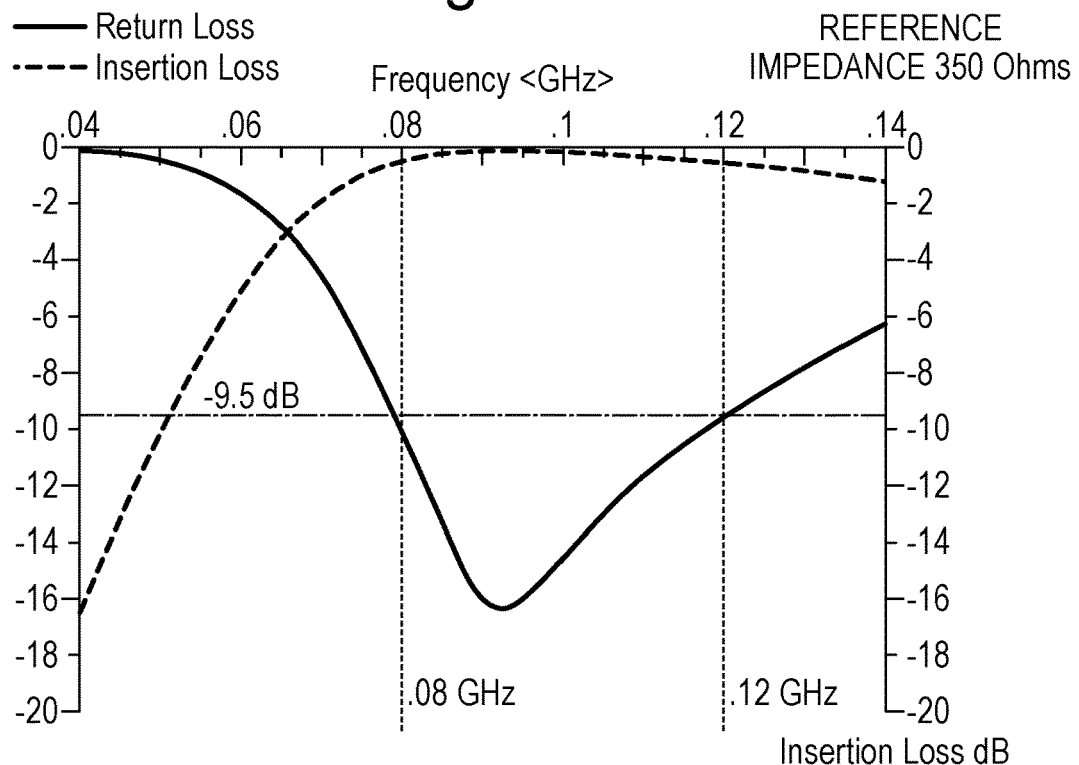
FIGS. 15A and 15B show the Insertion Loss and Transmission Loss responses of an acoustic transducer both with a buffer layer according to an embodiment of the invention (FIG. 16B) and without a buffer layer (FIG. 16A). The Electrical Insertion Loss plots illustrates the impact of a thin fused silica reflective buffer layer on the electrical impedance response between 40 MHz and 140 MHz for a 36°Y cut lithium niobate transducer bonded to a 36°Y cut lithium niobate substrate. The low acoustic impedance buffer layer modestly increases the fractional bandwidth of the transducer. Electrical tuning circuits were individually optimised to achieve a better than 2:1 VSWR match electrical match over the maximum possible fractional bandwidth. The target centre frequency of the transducers is 100 MHz. The transducer's Electrical Matched Response is calculated for a 3.2 µm thick (~(1/18.65)Λ thick at 100 MHz) fused silica buffer layer. Use of a buffer layer provides a 2:1 VSWR bandwidth of 44.9 MHz. The source impedance at the output of the transformer was 350 Ohms.
Figure 15B:
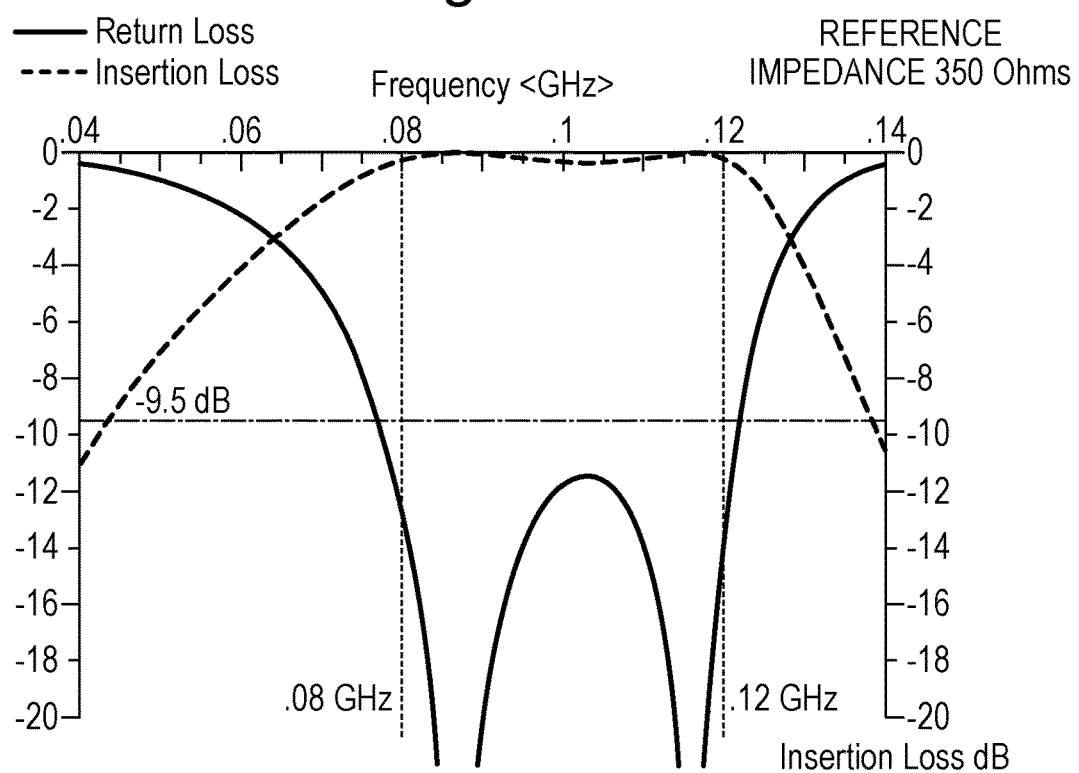
Figure 16A:
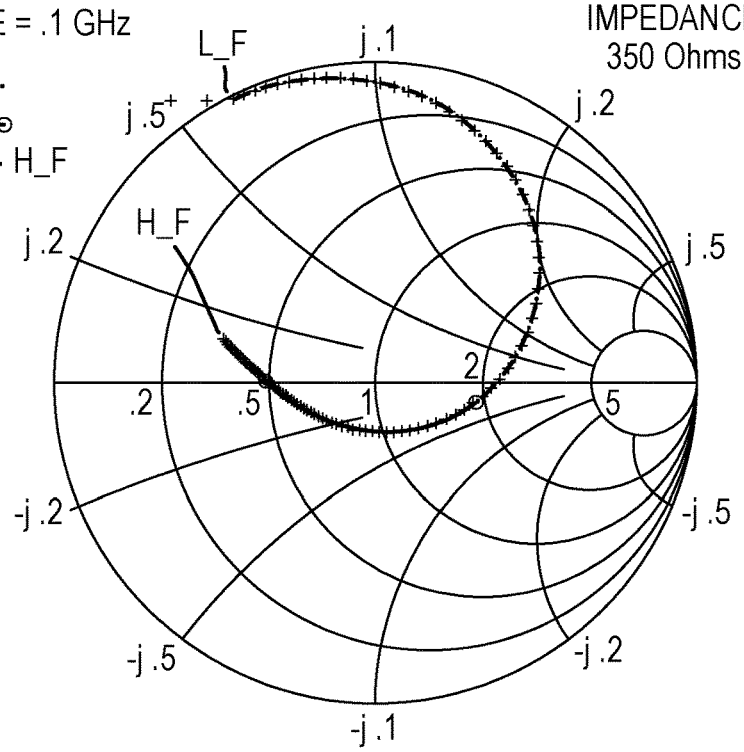
FIGS. 16A and 16B show the Smith Chart plots, corresponding to the Insertion loss plots of FIGS. 15A and 15B, for the acoustic transducer both with a buffer layer according to an embodiment of the invention (FIG. 16B) and without a buffer layer (FIG. 16A). The Reference Impedance of the two Smith Chart plots is 350 Ohms for FIG. 16A, and 350 Ohms for FIG. 16B.
Figure 16B:
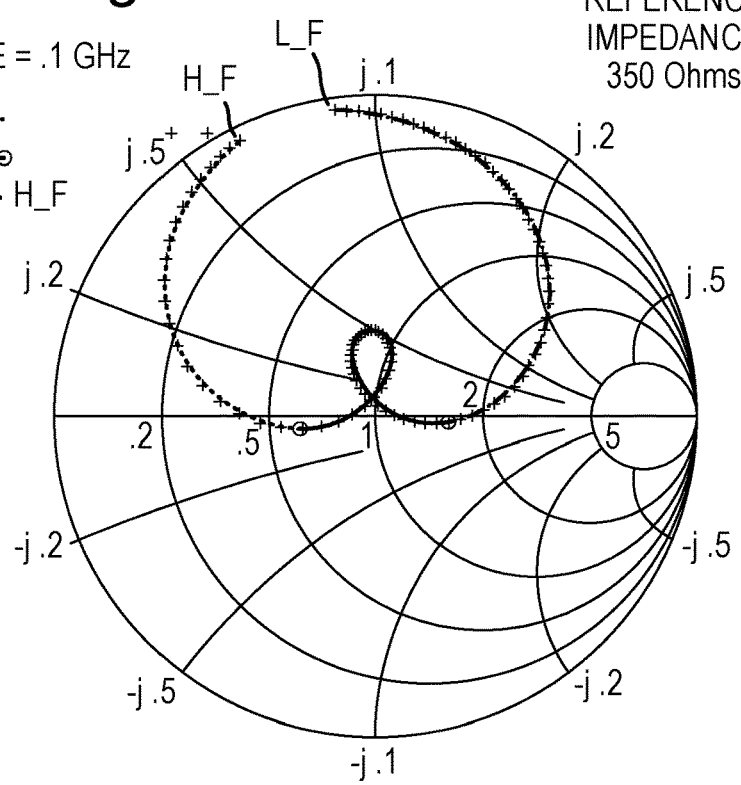
Figure 17A:
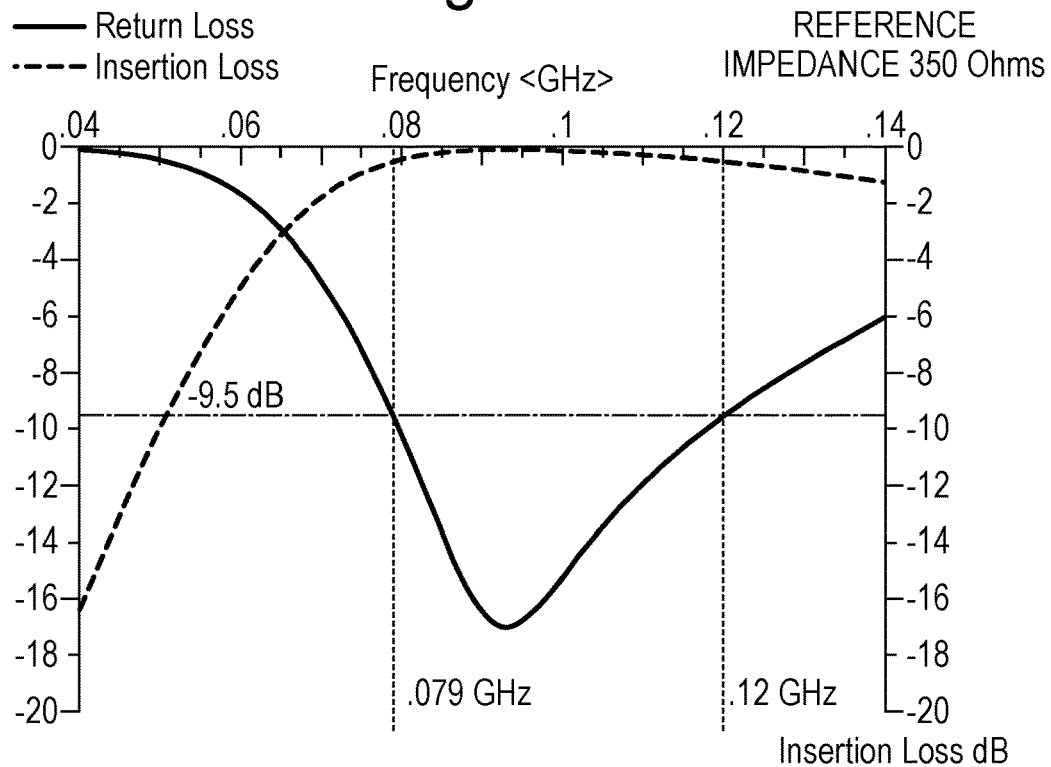
FIGS. 17A and 17B show the insertion loss and transmission loss responses of an acoustic transducer both with a buffer layer according to an embodiment of the invention (FIG. 17B) and without a buffer layer (FIG. 17A). The Electrical Insertion loss plots illustrate the impact of a C-axis orientated single crystal sapphire buffer layer on the electrical impedance response between 40 MHz and 140 MHz for a 36°Y cut lithium niobate transducer bonded to a 36°Y cut lithium niobate substrate. The high acoustic impedance buffer layer modestly increases the fractional bandwidth of the transducer. Electrical tuning circuits were individually optimised to achieve a better than 2:1 VSWR match over the maximum possible fractional bandwidth. The target centre frequency of the transducers is 100 MHz. The transducer's 2:1 VSWR Electrical Matched Response with a 3.2 µm thick (~(1/18.65)Λ thick at 100 MHz) C-axis Sapphire buffer layer was 51.5 MHz. The source Impedance at the output of the transformer was 250 Ohms.
Figure 17B:
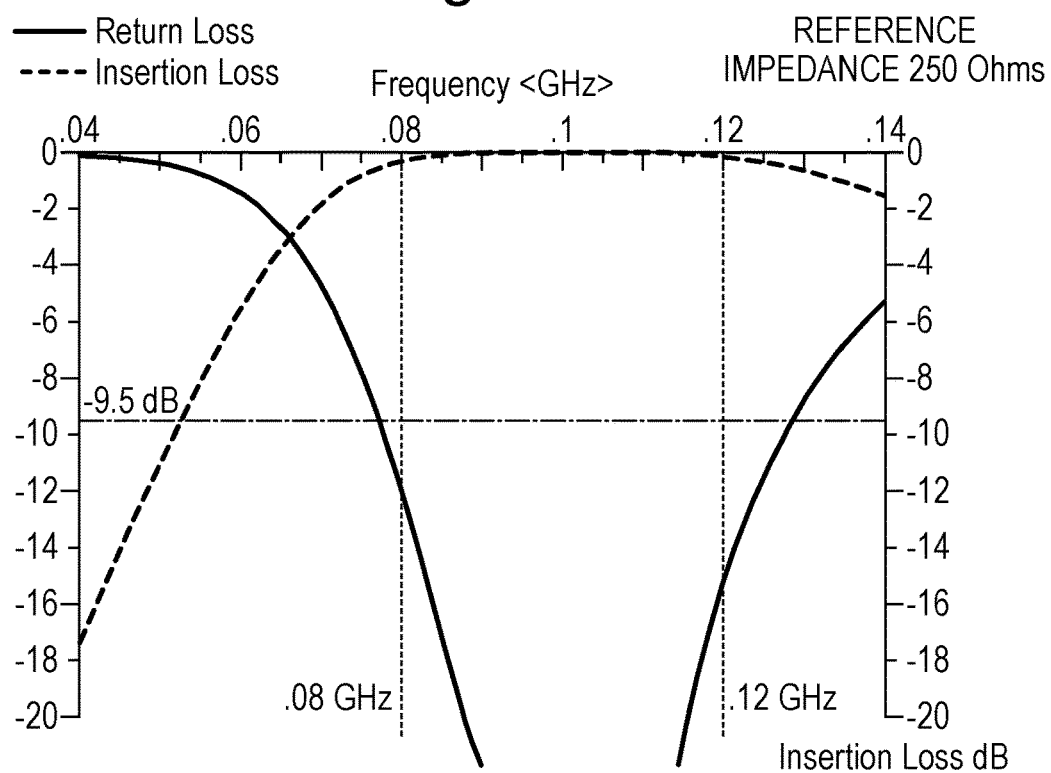
Figure 18A:
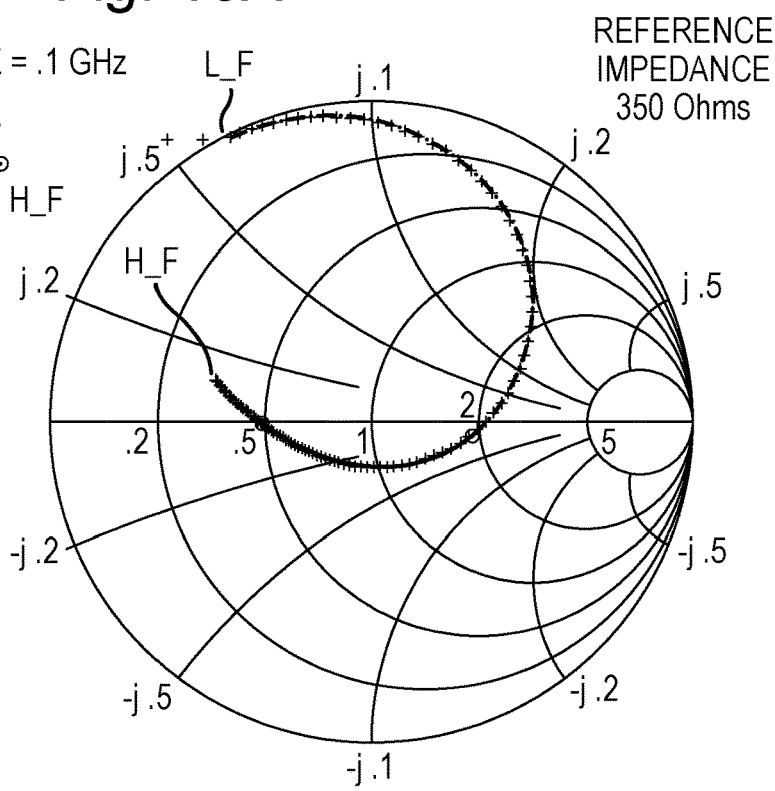
FIGS. 18A and 18B show the Smith Chart plots, corresponding to the Insertion Loss responses of FIGS. 17A and 17B, for the acoustic transducer both with a buffer layer according to an embodiment of the invention (FIG. 18B) and without a buffer layer (FIG. 18A). The Reference Impedance of the two Smith Chart plots is 350 Ohms for FIG. 18A, and 250 Ohms for FIG. 18B.
Figure 18B:
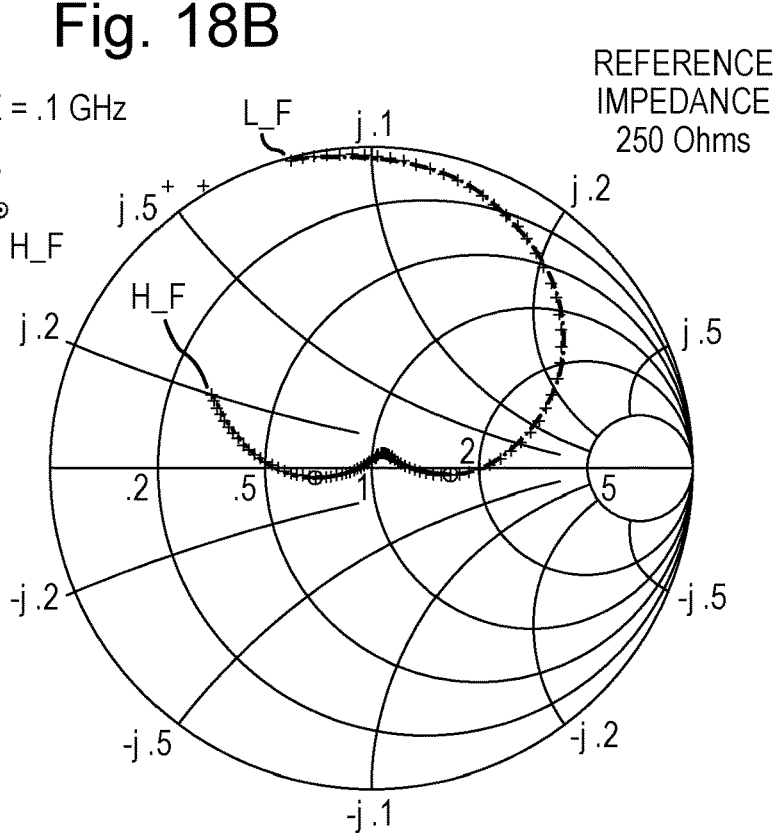
Figure 19A:
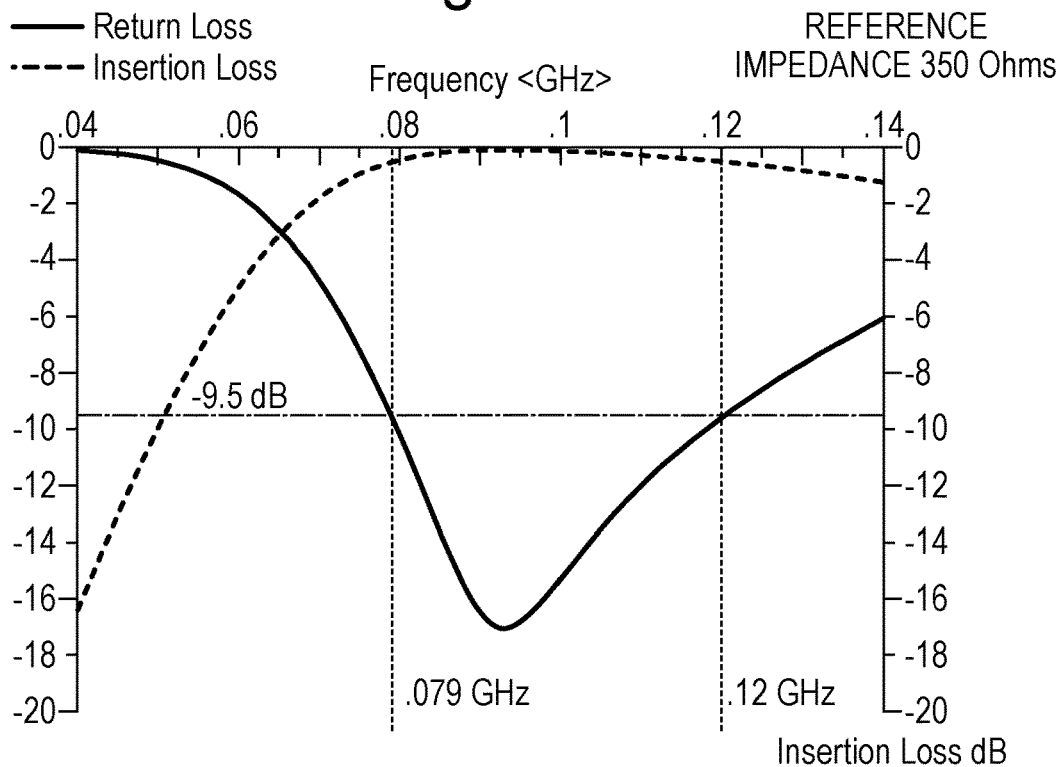
FIGS. 19A and 19B show the Insertion Loss and Transmission Loss responses of an acoustic transducer both with a buffer layer according to an embodiment of the invention (FIG. 19B) and without a buffer layer (FIG. 19A). The Electrical Insertion loss plots illustrates the impact of a gold buffer layer on the electrical impedance response between 40 MHz and 140 MHz for a 36°Y cut lithium niobate transducer bonded to a 36°Y cut lithium niobate substrate. The high acoustic impedance buffer layer further increases the fractional bandwidth of the transducer. Electrical tuning circuits were individually optimised to achieve a better than 2:1 VSWR match over the maximum possible fractional bandwidth. The target centre frequency of the transducers is 100 MHz. A 2:1 VSWR bandwidth of 55 MHz is achieved for the transducer's Electrical Matched Insertion Loss Response with a 2.8 µm thick (~(1/11.57)Λ thick at 100 MHz) C-axis Sapphire buffer layer. The source impedance at the output of the transformer was 250 Ohms.
Figure 19B:
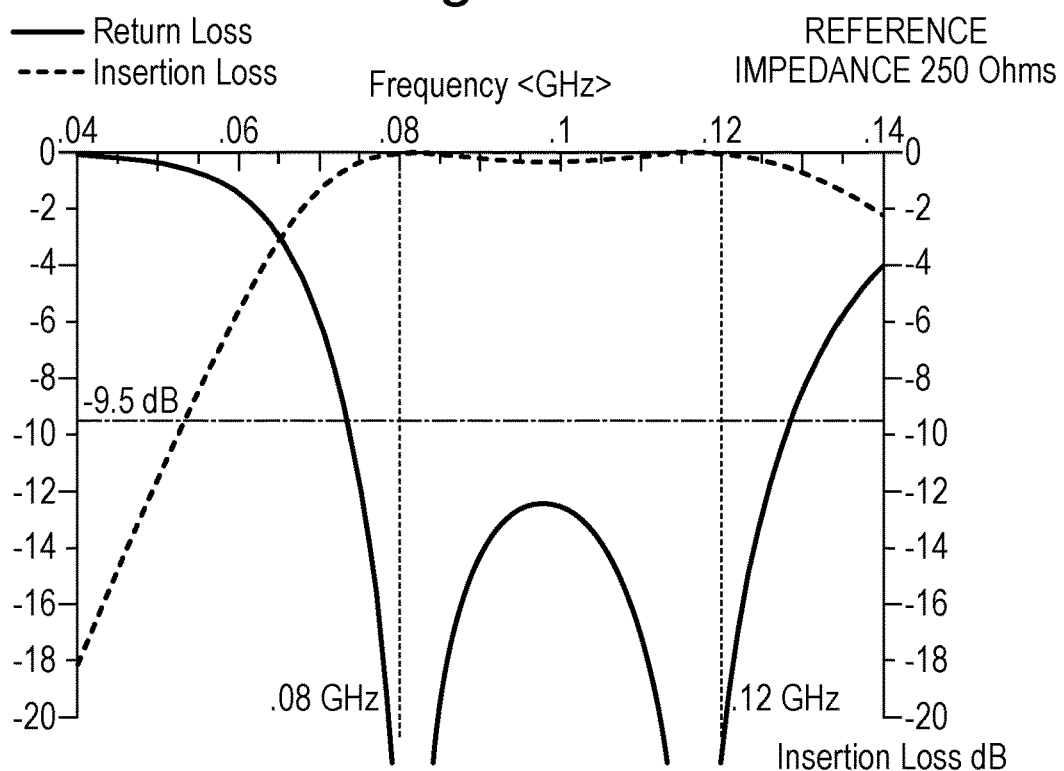
Figure 20A:
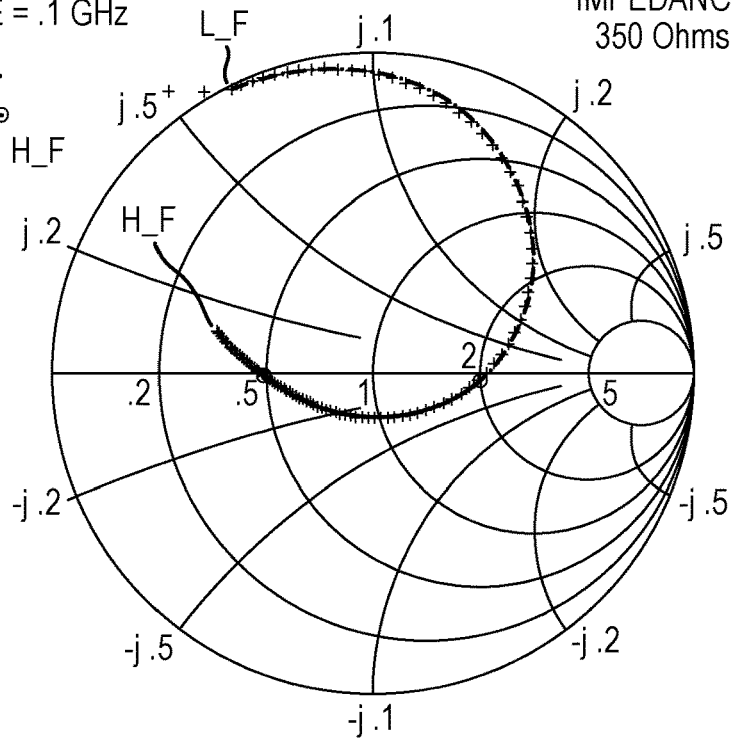
FIGS. 20A and 20B show the Smith Chart plots, corresponding to the Insertion Loss responses of FIGS. 19A and 19B, for the acoustic transducer both with a buffer layer according to an embodiment of the invention (FIG. 20B) and without a buffer layer (FIG. 20A) The Reference Impedance of the two Smith Chart plots is 350 Ohms for FIG. 20A, and 250 Ohms for FIG. 20B.
Figure 20B:
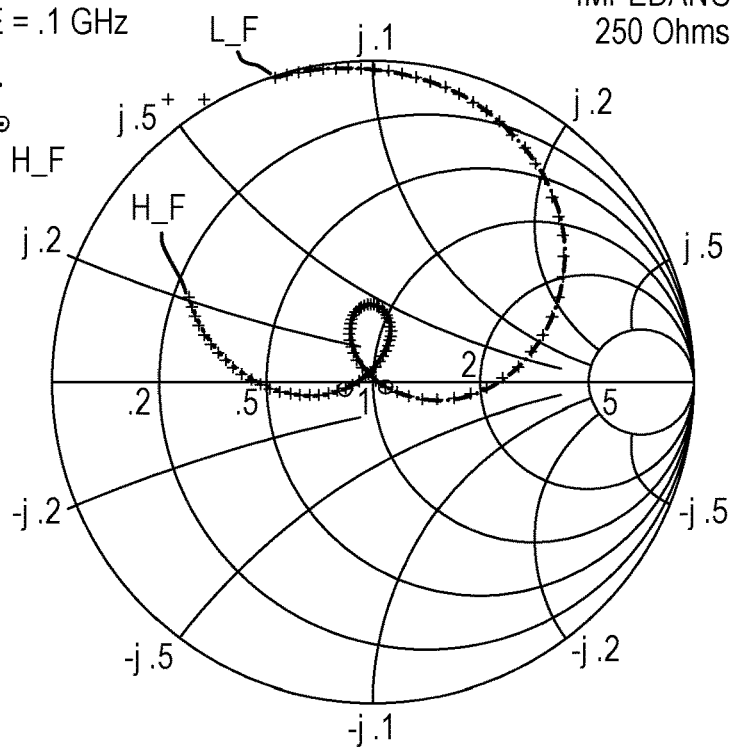

However reducing the thickness of the piezoelectric platelet to 'about' 0.3Λ completely changes matters. Now an acoustically thin (that is thickness<<Λ) high acoustic impedance gold buffer layer produces a very significant improvement bandwidth of the transducer yielding a fractional bandwidth of 0.526. This fractional bandwidth is about as high as can be achieved with a 36°Y cut lithium niobate transducer under even the most optimal transducer configuration conditions. FIGS. 13A and 13B show a plot of the electrical insertion loss while FIGS. 14A and 14B show a Smith Chart plot of the same design's complex impedance as a function of frequency.

It can be seen that the phase shift of the acoustic wave upon reflection is very different between the case of a 3.2 μm fused silica Buffer layer, and the case of a 4.8 μm thick gold Buffer layer.

Case 2: Piezoelectric Layer Whose Acoustic Impedance is Equal to that of the Main Substrate.

When the acoustic impedance of the piezoelectric layer and the main substrate are substantially the same or identical, it would be expected that any acoustically reflective layer between piezoelectric layer and the main substrate would increase the mechanical Q of the structure and hence reduce its fractional bandwidth. But this is not in fact the case. Without any buffer layer the optimal fractional bandwidth is achieved with an acoustically μ0.338Λ thick piezoelectric layer at the transducer's target centre frequency; i.e. 'about' 0.3Λ, not 'about' 0.5Λ. Adding a buffer layer to the transducer design again significantly increases its fractional bandwidth compared to the simpler transducer structure; and this outcome can be achieved using a buffer layer material whose acoustic impedance is either larger or alternatively smaller than both acoustic impedances of the piezoelectric layer and the main substrate.

The optimal thickness of the piezoelectric layer is as before desirably dependent on whether the buffer layer has a larger or lower acoustic impedance than the two media to which it is bonded; 'about' 0.5Λ thick at the target centre frequency when the acoustic impedance of the buffer layer is smaller; 'about' 0.3Λ at the target centre frequency when the acoustic impedance of the buffer layer is larger. These points are supported by the three sets of electrical insertion loss plots presented in FIGS. 15A and 15B, FIGS. 17A and 17B, and FIGS. 19A and 19B. In all three cases the fractional bandwidth is improved, and increasing the acoustic impedance mismatch of the buffer layer results in a larger loop in the Smith Chart plots of transducers as illustrated in FIGS. 16A and 16B, FIGS. 18A and 18B, and FIGS. 20A and 20B.

Case 3: Piezoelectric Layer Whose Acoustic Impedance is Greater than that of the Main Substrate.

In this case an optimal fractional bandwidth without any buffer layer is achieved with a piezoelectric layer whose thickness is typically in the range of about 0.4Λ to about 0.44Λ thick at the transducer's target centre frequency. This configuration generates a loop in the Smith Chart plot. A better result is achieved using a buffer layer of a material of acoustic impedance either lower or alternatively higher than the acoustic impedances of both the piezoelectric layer and the main substrate. For example, if the piezoelectric layer is lithium niobate (Z=34.33 MRayls), and the main substrate had an acoustic impedance of Z=26.6 MRayls, then a buffer layer can begin to offer benefits in the fractional bandwidth ($\Delta f/f_c$) of the transducer. For the case of a fused silica buffer layer there is no significant improvement, or detrimental effect on the fractional bandwidth. However, a thin gold buffer layer (Z=62.53 MRayls) does start to improve the fractional Bandwidth.

These three cases illustrate how an optimal acoustical thickness of the piezoelectric layer desirably is chosen according to the acoustical impedance of the buffer layer used: in cases 1 and 2 it is 'about' 0.5Λ when the acoustic impedance of the buffer layer is low; in case 3 it is 'about' 0.3Λ when the acoustic impedance of the buffer layer is high.

It is not an obvious outcome that a large increase in the matched bandwidth of the transducer can be achieved by adding a thin acoustically semi-reflective buffer layer; particularly if the acoustic impedance of the buffer layer is lower in value than the acoustic impedances values of both the piezoelectric layer and the main substrate. Logically it would be expected that such a layer should slightly impede the coupling of acoustic energy out of the piezoelectric medium into the bulk acoustic medium, and so reduce the frequency bandwidth of transducer.

TABLE 1A

| No. | Piezoelectric layer | Buffer Layer<br>Case 1 Configurations | Main Substrate | Power Reflection Coefficient R | 2:1 VSWR Fractional bandwidth ($\Delta f/f_c$) |
|---|---|---|---|---|---|
| 1a | 36° Y cut LiNbO$_3$<br>$Z_a$ = 34.33 MRayls<br>(0.295 Λ), ), Z = 225 Ohms | | C-axis Sapphire<br>$Z_a$ = 43.67 MRayls | 0.0143 | 0.410 |
| 2a | 36° Y cut LiNbO$_3$<br>$Z_a$ = 34.33 MRayls<br>(0.295 Λ), Z = 225 Ohms | 4.14 μm Gold<br>$Z_a$ = 62.53 MRayls<br>(1/7.83 Λ) | C-axis Sapphire<br>$Z_a$ = 43.67 MRayls | 0.1192 | 0.526 |
| 3a | *36° Y cut LiNbO$_3$*<br>*$Z_a$ = 34.33 MRayls*<br>*(0.338Λ) †, Z = 300 Ohms* | *3.2 μm Fused Silica*<br>*$Z_a$ = 13.13 MRayls*<br>*(1/18.65 Λ)* | *C-axis Sapphire*<br>*$Z_a$ = 43.67 MRayls* | *0.1660* | *0.112* |
| 4a | 36° Y cut LiNbO$_3$<br>$Z_a$ = 34.33 MRayls<br>(0.541 Λ), Z = 300 Ohms | | C-axis Sapphire<br>$Z_a$ = 43.67 MRayls | 0.0143 | 0.193 |
| 5a | 36° Y cut LiNbO$_3$<br>$Z_a$ = 34.33 MRayls<br>(0.541 Λ), Z = 300 Ohms | 3.2 μm Fused Silica<br>$Z_a$ = 13.13 MRayls<br>(1/18.65 Λ) | C-axis Sapphire<br>$Z_a$ = 43.67 MRayls | 0.1660 | 0.404 |
| 6a | *36° Y cut LiNbO$_3$*<br>*$Z_a$ = 34.33 MRayls*<br>*(0.541 Λ), Z = 200 Ohms* | *5.54 μm Gold*<br>*$Z_a$ = 62.53 MRayls*<br>*(1/5.85 Λ)* | *C-axis Sapphire*<br>*$Z_a$ = 43.67 MRayls* | *0.1631‡* | *0.083* |
| 7a | 36° Y cut LiNbO$_3$<br>$Z_a$ = 34.33 MRayls<br>(0.300 Λ), Z = 250 Ohms | | [110] Un-doped YAG<br>$Z_a$ = 40.68 MRayls | 0.0072 | 0.392 |
| 8a | 36° Y cut LiNbO$_3$<br>$Z_a$ = 34.33 MRayls<br>(0.287 Λ) | 4.94 μm Gold<br>$Z_a$ = 62.53 MRayls<br>(1/6.56 Λ) | [110] Un-doped YAG<br>$Z_a$ = 40.68 MRayls | 0.1639 | 0.516 |
| 9a | *36° Y cut LiNbO$_3$*<br>*$Z_a$ = 34.33 MRayls*<br>*(0.338 Λ) †, Z = 350 Ohms* | *3.2 μm Fused Silica*<br>*$Z_a$ = 13.13 MRayls*<br>*(1/18.65Λ)* | *[110] Un-doped YAG*<br>*$Z_a$ = 40.68 MRayls* | *0.1500* | *0.112* |
| 10a | 36° Y cut LiNbO$_3$<br>$Z_a$ = 34.33 MRayls<br>(0.530 Λ), Z = 350 Ohms | | [110] Un-doped YAG<br>$Z_a$ = 40.68 MRayls | 0.0072 | 0.227 |
| 11a | 36° Y cut LiNbO$_3$<br>$Z_a$ = 34.33 MRayls<br>(0.530 Λ), Z = 300 Ohms | 3.2 μm Fused Silica<br>$Z_a$ = 13.13 MRayls<br>(1/18.65 Λ) | [110] Un-doped YAG<br>$Z_a$ = 40.68 MRayls | 0.1500 | 0.431 |
| 12a | *36° Y cut LiNbO$_3$*<br>*$Z_a$ = 34.33 MRayls*<br>*(0.541 Λ)), Z = 200 Ohms* | *4.94 μm Gold*<br>*$Z_a$ = 62.53 MRayls*<br>*(1/6.56 Λ)* | *[110] Un-doped YAG*<br>*$Z_a$ = 40.68 MRayls* | *0.1639‡* | *0.080* |

TABLE 1B

| No. | Piezoelectric layer | Buffer Layer<br>Case 2 Configurations | Main Substrate | Power Reflection Coefficient R | 2:1 VSWR Fractional bandwidth ($\Delta f/f_c$) |
|---|---|---|---|---|---|
| 1b | 36° Y cut LiNbO$_3$<br>$Z_a$ = 34.33 MRayls<br>(0.338 Λ), Z = 350 Ohms | | 36° Y cut LiNbO$_3$<br>$Z_a$ = 34.33 MRayls | 0 | 0.412 |

TABLE 1B-continued

| | Interface type | | | Power Reflection Coefficient R | 2:1 VSWR Fractional bandwidth ($\Delta f/f_c$) |
|---|---|---|---|---|---|
| No. | Piezoelectric layer | Buffer Layer | Main Substrate | | |
| | | Case 2 Configurations | | | |
| 2b | 36° Y cut LiNbO$_3$ $Z_a$ = 34.33 MRayls (0.378 Λ), Z = 350 Ohms | | 36° Y cut LiNbO$_3$ $Z_a$ = 34.33 MRayls | 0 | 0.467 |
| 3b | 36° Y cut LiNbO$_3$ $Z_a$ = 34.33 MRayls (0.324 Λ), Z = 250 Ohms | 14 μm C-axis Sapphire $Z_a$ = 43.67 MRayls (1/7.86 Λ) | 36° Y cut LiNbO$_3$ $Z_a$ = 34.33 MRayls | 0.0295 | 0.501 |
| 4b | 36° Y cut LiNbO$_3$ $Z_a$ = 34.33 MRayls (0.321 Λ), Z = 250 Ohms | 2.94 μm Gold $Z_a$ = 62.53 MRayls (1/11.0 Λ) | 36° Y cut LiNbO$_3$ $Z_a$ = 34.33 MRayls | 0.1055 | 0.545 |
| 5b | 36° Y cut LiNbO$_3$ $Z_a$ = 34.33 MRayls (0.338 Λ), Z = 250 Ohms | 4.2 μm Dummy Sapphire $Z_a$ = 43.67 MRayls (1/26.2 Λ) | 36° Ycut LiNbO$_3$ $Z_a$ = 34.33 MRayls | 0.0833 | 0.562 |
| 6b | *36° Y cut LiNbO$_3$* *$Z_a$ = 34.33 MRayls* *(0.338 Λ), Z = 200 Ohms* | *3.2 μm Fused Silica* *$Z_a$ = 13.13 MRayls* *(1/18.65 Λ)* | *36° Ycut LiNbO$_3$* *$Z_a$ = 34.33 MRayls* | *0.1198* | *0.131* |
| 7b | *36° Y cut LiNbO$_3$* *$Z_a$ = 34.33 MRayls* *(0.5 Λ), Z = 350 Ohms* | | *36° Y cut LiNbO$_3$* *$Z_a$ = 34.33 MRayls* | *0* | *0.326* |
| 8b | 36° Y cut LiNbO$_3$ $Z_a$ = 34.33 MRayls (0.52 Λ), Z = 350 Ohms | 3.2 μm Fused Silica $Z_a$ = 13.13 MRayls (1/18.65 Λ) | 36° Y cut LiNbO$_3$ $Z_a$ = 34.33 MRayls | 0.1198 | 0.455 |
| 9b | *36° Y cut LiNbO$_3$* *$Z_a$ = 34.33 MRayls* *(0.52 Λ), Z = 300 Ohms* | *14 μm C-axis Sapphire* *$Z_a$ = 43.67 MRayls* *(1/7.86 Λ)* | *36° Y cut LiNbO$_3$* *$Z_a$ = 34.33 MRayls* | *0.0295* | *0.158* |
| 10b | *36° Y cut LiNbO$_3$* *$Z_a$ = 34.33 MRayls* *(0.541 Λ), Z = 250 Ohms* | *2.94 μm Gold* *$Z_a$ = 62.53 MRayls* *(1/11.0 Λ)* | *36° Ycut LiNbO$_3$* *$Z_a$ = 34.33 MRayls* | *0.1055* | *0.092* |

TABLE 1C

| | Interface type | | | Power Reflection Coefficient R | 2:1 VSWR Fractional bandwidth ($\Delta f/f_c$) |
|---|---|---|---|---|---|
| No. | Piezoelectric layer | Buffer Layer | Main Substrate | | |
| | | Case 3 Configurations | | | |
| 1c | 36° Y cut LiNbO$_3$ $Z_a$ = 34.33 MRayls (0.344 Λ), Z = 350 Ohms | | Glass 1 $Z_a$ = 26.26 MRayls | 0.0178 | 0.504 |
| 2c | 36° Y cut LiNbO$_3$ $Z_a$ = 34.33 MRayls (0.344 Λ), Z = 250 Ohms | 10 μm [110] YAG $Z_a$ = 40.68 MRayls (1/8.92 Λ) | Glass 1 $Z_a$ = 26.26 MRayls | 0.04795 | 0.530 |
| 3c | 36° Y cut LiNbO$_3$ $Z_a$ = 34.33 MRayls (0.389 Λ), Z = 350 Ohms | 1.04 μm Gold $Z_a$ = 62.53 MRayls (1/31.2 Λ) | Glass 1 $Z_a$ = 26.26 MRayls | 0.0413 | 0.552 |
| 4c | 36° Y cut LiNbO$_3$ $Z_a$ = 34.33 MRayls (0.389 Λ), Z = 350 Ohms | 2.04 μm Gold $Z_a$ = 62.53 MRayls (1/15.9 Λ) | Glass 1 $Z_a$ = 26.26 MRayls | 0.0997 | 0.558 |
| 5c | *36° Y cut LiNbO$_3$* *$Z_a$ = 34.33 MRayls* *(0.344 Λ)* | *3.2 μm Fused silica* *$Z_a$ = 13.13 MRayls* *(1/18.65 Λ)* | *Glass 1* *$Z_a$ = 26.26 MRayls* | *0.0987* | *0.170* |
| 6c | 36° Y cut LiNbO$_3$ $Z_a$ = 34.33 MRayls (0.487 Λ), Z = 300 Ohms | | Glass 1 $Z_a$ = 26.26 MRayls | 0.0178 | 0.463 |
| 7c | 36° Y cut LiNbO$_3$ $Z_a$ = 34.33 MRayls (0.487 Λ), Z = 400 Ohms | 3.0 μm Fused silica $Z_a$ = 13.13 MRayls (1/19.9 Λ) | Glass 1 $Z_a$ = 26.26 MRayls | 0.0900 | 0.515 |
| 8c | 36° Y cut LiNbO$_3$ $Z_a$ = 34.33 MRayls (0.5 Λ), Z = 300 Ohms | | Glass 1 $Z_a$ = 26.26 MRayls | 0.0178 | 0.435 |
| 9c | 36° Y cut LiNbO$_3$ $Z_a$ = 34.33 MRayls (0.5 Λ), Z = 350 Ohms | 3.0 μm Fused silica $Z_a$ = 13.13 MRayls (1/19.9 Λ) | Glass 1 $Z_a$ = 26.26 MRayls | 0.0900 | 0.497 |
| 10c | *36° Y cut LiNbO$_3$* *$Z_a$ = 34.33 MRayls* *(0.5 Λ), Z = 300 Ohms* | *1.04 μm Gold* *$Z_a$ = 62.53 MRayls* *(1/31.2 Λ)* | *Glass 1* *$Z_a$ = 26.26 MRayls* | *0.0413* | *0.335* |

Tables 1Aa, 1Bb and 1Cc each tabulate the 'contrast' (P) of the resistive impedance of the electrically matched transducer over the 2:1 VSWR frequency bandwidth, where:

$$P=(R_{MAX}-R_{MIN})/(R_{MAX}+R_{MIN})\times 100\%$$

Here, $R_{MAX}$ is the maximum value of the resistive impedance of the transducer occurring within the frequency bandwidth (90 MHz to 110 MHz). $R_{MIN}$ is the minimum value of the resistive impedance of the transducer occurring within the frequency bandwidth. The acoustical frequency at which $R_{MAX}$ or $R_{MIN}$ occurs is tabulated within the tables within square brackets. For example, for the buffer layer design of case 1 tabulated in Table 1Aa, $R_{MAX}$=242.4 Ohms occurred at a frequency of 110.0 MHz, whereas $R_{MIN}$=210.0 Ohms occurred at a frequency of 91.5 MHz. In many cases, these extreme values of resistive impedance occur at either end of the frequency bandwidth, but sometimes they occur within the bandwidth.

These tables show that, in each of case 1, case 2 and case 3, the resistive impedance contrast of the transducer across the bandwidth, is very significantly reduced. It falls approximately 4-fold in all cases: case 1—falling from 28% to 7%; case 2—falling from 41% to 12%; case 3—falling from 16% to 4%. This beneficial result means that the total acoustic power launched is much more uniform across the 20 MHz central bandwidth. As described above, this is a desirable result.

TABLE 1Aa

Case 1 Configurations

| Interface Type | | | Resistance, Ohms [frequency, MHz] | | Resistance Contrast (P) P = $(R_{MAX} - R_{MIN})/(R_{MAX} + R_{MIN})$ × 100% |
|---|---|---|---|---|---|
| Piezoelectric layer | Buffer Layer | Main Substrate | $R_{MAX}$ | $R_{MIN}$ | |
| 36° Y cut LiNbO$_3$ $Z_a$ = 34.33 MRayls (0.295 Λ), Z = 225 Ohms | | C-axis Sapphire $Z_a$ = 43.67 MRayls | 282.2 [90.0] | 157.2 [110.0] | 28% |
| 36° Y cut LiNbO$_3$ $Z_a$ = 34.33 MRayls (0.295 Λ), Z = 225 Ohms | 4.14 μm Gold $Z_a$ = 62.53 MRayls (1/7.83 Λ) | C-axis Sapphire $Z_a$ = 43.67 MRayls | 242.4 [110.0] | 210.0 [91.5] | 7% |

TABLE 1Bb

Case 2 Configurations

| Interface Type | | | Resistance, Ohms [frequency, MHz] | | Resistance Contrast (P) P = $(R_{MAX} - R_{MIN})/(R_{MAX} + R_{MIN})$ × 100% |
|---|---|---|---|---|---|
| Piezoelectric layer | Buffer Layer | Main Substrate | $R_{MAX}$ | $R_{MIN}$ | |
| 36° Y cut LiNbO$_3$ $Z_a$ = 34.33 MRayls (0.5 Λ), Z = 350 Ohms | | 36° Y cut LiNbO$_3$ $Z_a$ = 34.33 MRayls | 585.6 [90.0] | 242.7 [110.0] | 41% |
| 36° Y cut LiNbO$_3$ $Z_a$ = 34.33 MRayls (0.52 Λ), Z = 350 Ohms | 3.2 μm Fused Silica $Z_a$ = 13.13 MRayls (1/18.65 Λ) | 36° Y cut LiNbO$_3$ $Z_a$ = 34.33 MRayls | 358.7 [110.0] | 280.1 [97.5] | 12% |

TABLE 1Cc

Case 3 Configurations

| Interface Type | | | Resistance, Ohms [frequency, MHz] | | Resistance Contrast (P) P = $(R_{MAX} - R_{MIN})/(R_{MAX} + R_{MIN})$ × 100% |
|---|---|---|---|---|---|
| Piezoelectric layer | Buffer Layer | Main Substrate | $R_{MAX}$ | $R_{MIN}$ | |
| 36° Y cut LiNbO$_3$ $Z_a$ = 34.33 MRayls (0.439 Λ), Z = 350 Ohms | | Glass 1 $Z_a$ = 26.26 MRayls | 396.6 [90.0] | 326.4 [110.0] | 16% |

TABLE 1Cc-continued

Case 3 Configurations

| Interface Type | | | Resistance, Ohms [frequency, MHz] | | Resistance Contrast (P) $P = (R_{MAX} - R_{MIN})/(R_{MAX} + R_{MIN}) \times$ |
|---|---|---|---|---|---|
| Piezoelectric layer | Buffer Layer | Main Substrate | $R_{MAX}$ | $R_{MIN}$ | 100% |
| 36° Y cut LiNbO$_3$ $Z_a$ = 34.33 MRayls (0.344 Λ), Z = 250 Ohms | 10 μm [110] YAG $Z_a$ = 40.68 MRayls (1/8.92 Λ) | Glass 1 $Z_a$ = 26.26 MRayls | 275.5 [108] | 244.4 [92.5] | 4% |

TABLE 2

Amplitude Reflection Coefficient at the interface structures between the piezoelectric transducer platelet and various acoustic substrates into which acoustic waves are launched

| Interface type | | | Reflection Coefficient (r) | |
|---|---|---|---|---|
| Piezoelectric layer | Buffer Layer | Main Substrate | Magnitude | Phase |
| 36° Y cut LiNbO$_3$ (0.295 Λ) or (0.541 Λ) | | C-axis Sapphire | 0.1197 | 0° |
| 36° Y cut LiNbO$_3$ (0.541 Λ) | 3.2 μm Fused Silica (1/18.65 Λ) | C-axis Sapphire | 0.4074 | 105.0° |
| 36° Y cut LiNbO$_3$ (0.295 Λ) | 4.14 μm Gold (1/7.83 Λ) | C-axis Sapphire | 0.3452 | −27.8° |
| *36° Y cut LiNbO$_3$ (0.541 Λ)* | *5.54 μm Gold (1/5.85 Λ)* | *C-axis Sapphire* | *0.4039* | *−18.6°* |
| 36° Y cut LiNbO$_3$ (0.541 Λ) | | [001] Un-doped YAG | 0.0846 | 0° |
| 36° Y cut LiNbO$_3$ (0.530 Λ) | 3.2 μm Fused Silica (1/18.65 Λ) | [110] Un-doped YAG | 0.3873 | 108.2° |
| 36° Y cut LiNbO$_3$ (0.287 Λ) | 4.8 μm Gold (1/6.75 Λ) | [110] Un-doped YAG | 0.3984 | −26.6° |
| 36° Y cut LiNbO$_3$ (0.52 Λ) | 3.2 μm Fused Silica (1/18.65 Λ) | 36° Y cut LiNbO$_3$ | 0.3462 | 117.7° |
| 36° Y cut LiNbO$_3$ (0.324 Λ) | 14 μm C-axis Sapphire (1/7.86 Λ) | 36° Y cut LiNbO$_3$ | 0.1716 | −43.4° |
| 36° Y cut LiNbO$_3$ (0.321 Λ) | 2.94 μm Fused Gold (1/11.0 Λ) | 36° Y cut LiNbO$_3$ | 0.3248 | −52.8° |
| *36° Y cut LiNbO$_3$ (0.439 Λ)* | | *Glass 1* | *0.1332* | *180°* |
| 36° Y cut LiNbO$_3$ (0.487 Λ) | 3.0 μm Fused silica (1/19.9 Λ) | Glass 1 | 0.2999 | 137.8° |
| 36° Y cut LiNbO$_3$ (0.389 Λ) | 1.04 μm Gold (1/31.2 Λ) | Glass 1 | 0.2033 | −114.8° |
| 36° Y cut LiNbO$_3$ (0.453 Λ) | | Fused silica | 0.4467 | 180° |

TABLE 3

Densities, acoustic velocities, and acoustic impedances of sample materials

| Material | Density ρ [$10^3$ kg/m$^3$] | $V_a$ Acoustic longitudinal Velocity [m/s] | Acoustic impedance ($\rho V_a$) [MRayls] |
|---|---|---|---|
| 36° Y cut LiNbO$_3$ | 4.64 | 7399 | 34.33 |
| Gold | 19.3 | 3240 | 62.53 |
| Fused Silica | 2.2 | 5968 | 13.13 |
| Sapphire [001] | 3.97 | 11000 | 43.67 |
| Un-doped YAG [110] | 4.56 | 8921 | 40.68 |
| Glass 1 | 4.4 | 5968 | 26.26 |
| Dummy Sapphire | 9.0 | 11000 | 99.00 |

Dummy Sapphire, of density 9.0×10$^3$ kg/m3, does not exist but was used in modelling to show that a thin buffer layer of this hypothetical very high acoustic impedance material could yield an even larger fractional bandwidth for a 36°Y cut lithium niobate transducer bonded to a 36°Y cut substrate.

The longitudinal acoustic transducer according to preferred embodiments of the invention, possesses an increased fractional bandwidth. There exists a need for transducers with the largest possible fractional bandwidth $\Delta f/f_c$ to support high data rate MIMO-OFDM communications through a solid barrier using ultrasound. This allows the frequency bandwidth, required to support a given data transmission rate, to be achieved at the lowest possible frequency range. This is beneficial as it will reduce the frequency dependent acoustic attenuation slope for signal transmission across an acoustically attenuating barrier.

APPENDIX 1: MASON MODEL DESCRIPTION

The Mason model of a bulk wave acoustic transducer is an equivalent circuit model. This model accurately represents the conversion of electrical signals by the piezoelectric transducer into mechanical signals and vice versa.

All transducers are characterised by three ports; an electrical port to the two electrodes that sandwich the piezoelectric layer, and two mechanical ports through which acoustic power signals may be transmitted or received. This three-port geometry represents the fact that electrical energy can be converted into acoustic energy which in turn can be coupled out of either end of the transducer. Onto each end of the piezoelectric layer are bonded various acoustically 'passive' layers; on one side the top electrode, on the other side the ground electrode and directly below the ground electrode other layers such as impedance matching layers or the Buffer layer described here, followed by the substrate.

Each of these 'passive' layers are represented by a transmission line whose impact on the electrical properties of the transducer are represented by the impedance expressions shown in FIG. 7. These expressions are functions of the acoustic impedance $Z_i$ of the layer given by the product of its acoustic velocity and density, the layer's thickness $L_i$ and the acoustic $k_i$ vector which is equal to $2\pi/\Lambda$ where $\Lambda$ is the acoustic wavelength at the frequency of operation. The effects of acoustic attenuation can be modelled by making the acoustic k vector a complex parameter, in which the imaginary component represents the acoustic attenuation per unit length. The effect of additional layers on the electrical properties of the transducer is modelled by inserting an additional acoustic transmission line element, one for each layer in the sequence.

Although a transducer is theoretically a three-port device, one end is usually unloaded and therefore effectively short circuited as shown on the left-hand side of FIG. 7. In the event that the transducer is mechanically loaded with an acoustic termination that absorbs all of the power that enters it, then the electrical impact of this load is represented in the model by replacing the short circuit by an impedance $Z_b$ equal to the acoustic impedance of the acoustically non-resonant termination. Likewise, if the acoustic termination of the substrate layer is essentially an acoustic sink for any acoustic signals that enter it, then the air short shown on the right-hand side of FIG. 7 is replaced by the acoustic impedance of the acoustic termination.

The transformer, with turns ratio $1:eC_0/\varepsilon^S$, shown in FIG. 7, represents the transformer function of the piezoelectric layer in converting electrical signals into mechanical signals and vice versa. The capacitance $C_0$ represents the capacitance of the electrodes on the opposite faces of the piezoelectric layer. The parameter e represents the effective piezoelectric constant of the piezoelectric layer that is accessed by the electric field across the thickness of the transducer, while $\varepsilon^S$ represents the dielectric permittivity of the same layer for constant strain. The model contains a negative capacitance element which, while nonphysical, is required to model correctly the electrical characteristics of a transducer.

The Mason Model is well established and has been used successfully for over many years to design transducers for both acoustic delay lines and acousto-optic devices over a wide range of frequencies by the applicant. On different devices this frequency range has extended from ~1 MHz all the way up to ~8 GHz.

The invention claimed is:
1. An electroacoustic transducer, comprising:
   a piezoelectric part comprising a piezoelectric material having a first acoustical impedance and an acoustical thickness;
   a substrate part comprising a material having a second acoustical impedance; and
   an intermediate part comprising a material having a third acoustical impedance and at least partially between the piezoelectric part and the substrate part for acoustical communication therewith,
   wherein the first acoustical impedance and the second acoustical impedance each has a respective value within a range of values for which the value of the third acoustical impedance is
      an upper limit if said acoustical thickness of the piezoelectric part is less than 0.4Λ, or
      a lower limit if said acoustical thickness of the piezoelectric part is greater than 0.4Λ,
   wherein Λ is an acoustical wavelength in the material of the piezoelectric part, and
   wherein a maximum relative change in electrical resistive impedance of the transducer when the transducer is driven to generate an acoustic signal of any acoustic frequency within a frequency range, relative to the electrical resistive impedance of the transducer when driven to generate an acoustic signal of any other acoustic frequency within the frequency range, is less than about 25%.

2. The electroacoustic transducer according to claim 1, wherein:
   the acoustical thickness of the piezoelectric part is within the range 0.2Λ to 0.4Λ, and
   the value of the third acoustical impedance is an upper limit to the range of values at that acoustical wavelength (Λ).

3. The electroacoustic transducer according to claim 1, wherein:
   the acoustical thickness of the piezoelectric part is within the range 0.4Λ to 0.6Λ, and
   the value of the third acoustical impedance is a lower limit to the range of values at that acoustical wavelength (Λ).

4. The electroacoustic transducer according to claim 1, in which the value of the first acoustical impedance is less than the value of the second acoustical impedance.

5. The electroacoustic transducer according to claim 1, in which the acoustical thickness of the intermediate part between the piezoelectric part and the substrate part is less than 0.2Λ', wherein Λ' is an acoustical wavelength in the material of the intermediate part.

6. The electroacoustic transducer according to claim 1, wherein the transducer is arranged to be driven to generate an acoustic signal of acoustic frequency within the frequency range of about 90 MHz to about 110 MHz, whereby the maximum relative change in electrical resistive impedance of the transducer when the transducer is driven to generate an acoustic signal of any acoustic frequency within said frequency range relative to the electrical resistive impedance of the transducer when driven to generate an acoustic signal of any other acoustic frequency within said frequency range, is less than about 25%.

7. The electroacoustic transducer according to claim 6, wherein the maximum relative change (P) in electrical resistive impedance of the transducer is:

$$P = (R_{MAX} - R_{MIN})/(R_{MAX} + R_{MIN}) \times 100\%$$

where $R_{MAX}$ and $R_{MIN}$ are, respectively, the maximum and minimum values of the electrical resistive impedance to occur within the frequency range.

8. A data transceiver system, comprising the electroacoustic transducer of claim 1, wherein the electroacoustic transducer is utilized as a data transmitter, or a data receiver.

9. The data transceiver system of claim 8, wherein the electroacoustic transducer is bonded to a solid transmission medium, via which medium data can be transmitted and/or received by the electroacoustic transducer.

10. The data transceiver system of claim 9, wherein the electroacoustic transducer is a first electroacoustic transducer, the system further comprising a second electroacoustic transducer according to claim 1, the first and second electroacoustic transducers being bonded to substantially opposite ends or sides of the solid transmission medium, to allow for acoustic data transmission between the first and second electroacoustic transducers via the solid transmission medium.

11. The data transceiver system of claim 10, further comprising an electroacoustic controller associated with the first electroacoustic transducer, the electroacoustic controller for:
    controlling the first transducer to generate an outgoing acoustic signal, for transmitting data to the second electroacoustic transducer, via the solid transmission medium, using that outgoing acoustic signal; and/or
    receiving data from the first electroacoustic transducer as a result of the first electroacoustic transducer receiving an incoming acoustic signal.

12. The data transceiver system of claim 10, wherein the electroacoustic controller is a first electroacoustic controller, the system further comprising a second electroacoustic controller associated with the second electroacoustic transducer, the second electroacoustic controller for:
    controlling the second transducer to generate an outgoing acoustic signal, for transmitting data to the first electroacoustic transducer, via the solid transmission medium, using that outgoing acoustic signal; and/or
    receiving data from the second electroacoustic transducer as a result of the second electroacoustic transducer receiving an incoming acoustic signal.

13. An electroacoustic transducer, comprising:
    a piezoelectric part comprising a piezoelectric material having a first acoustical impedance;
    a substrate part comprising a material having a second acoustical impedance; and
    an intermediate part comprising a material having a third acoustical impedance and at least partially between the piezoelectric part and the substrate part for acoustical communication therewith,
    wherein an acoustical thickness of the intermediate part between the piezoelectric part and the substrate part is less than $0.2\Lambda'$, wherein $\Lambda'$ is an acoustical wavelength in the material of the intermediate part, and
    wherein the first acoustical impedance and the second acoustical impedance each has a respective value within a range of values for which the value of the third acoustical impedance is
        an upper limit if an acoustical thickness of the piezoelectric part is less than $0.4\Lambda$, or
        a lower limit if said acoustical thickness of the piezoelectric part is greater than $0.4\Lambda$,
        wherein $\Lambda$ is an acoustical wavelength in the material of the piezoelectric part, and
        wherein a maximum relative change in electrical resistive impedance of the transducer when the transducer is driven to generate an acoustic signal of any acoustic frequency within a frequency range, relative to the electrical resistive impedance of the transducer when driven to generate an acoustic signal of any other acoustic frequency within the frequency range, is less than about 25%.

14. The electroacoustic transducer according to claim 13, wherein:
    the acoustical thickness of the piezoelectric part is within the range $0.2\Lambda$ to $0.4\Lambda$, and
    the value of third acoustical impedance is an upper limit to the range of values at that acoustical wavelength ($\Lambda$).

15. The electroacoustic transducer according to claim 13, wherein:
    the acoustical thickness of the piezoelectric part is within the range $0.4\Lambda$ to $0.6\Lambda$, and
    the value of third acoustical impedance is a lower limit to the range of values at that acoustical wavelength ($\Lambda$).

16. The electroacoustic transducer according to claim 13, in which the value of the first acoustical impedance is less than the value of the second acoustical impedance.

17. The electroacoustic transducer according to claim 13, in which the acoustical thickness of the intermediate part between the piezoelectric part and the substrate part is less than $0.2\Lambda'$, wherein $\Lambda'$ is an acoustical wavelength in the material of the intermediate part.

18. A data transceiver system, comprising the electroacoustic transducer of claim 13, wherein the electroacoustic transducer is utilized as a data transmitter, or a data receiver.

19. The data transceiver system of claim 18, wherein the electroacoustic transducer is a first electroacoustic transducer that is bonded to a solid transmission medium, via which medium data can be transmitted and/or received by the first electroacoustic transducer, the system further comprising a second electroacoustic transducer according to claim 1, the first and second electroacoustic transducers being bonded to substantially opposite ends or sides of the solid transmission medium, to allow for acoustic data transmission between the first and second electroacoustic transducers via the solid transmission medium.

20. The data transceiver system of claim 19, further comprising:
    a first electroacoustic controller associated with the first electroacoustic transducer, the electroacoustic controller for
        controlling the first transducer to generate an outgoing acoustic signal, for transmitting data to the second electroacoustic transducer, via the solid transmission medium, using that outgoing acoustic signal, and/or
        receiving data from the first electroacoustic transducer as a result of the first electroacoustic transducer receiving an incoming acoustic signal; and
    a second electroacoustic controller associated with the second electroacoustic transducer, the second electroacoustic controller for
        controlling the second transducer to generate an outgoing acoustic signal, for transmitting data to the first electroacoustic transducer, via the solid transmission medium, using that outgoing acoustic signal, and/or
        receiving data from the second electroacoustic transducer as a result of the second electroacoustic transducer receiving an incoming acoustic signal.

* * * * *